(12) United States Patent
Kawabe et al.

(10) Patent No.: US 7,571,524 B2
(45) Date of Patent: Aug. 11, 2009

(54) METHOD OF PRODUCING A SPREAD MULTI-FILAMENT BUNDLE AND AN APPARATUS USED IN THE SAME

(75) Inventors: Kazumasa Kawabe, Fukui (JP); Shigeru Tomoda, Fukui (JP)

(73) Assignee: Fukui Prefectural Governmant, Fukui (JP)

( * ) Notice: Subject to any disclaimer, the term of this patent is extended or adjusted under 35 U.S.C. 154(b) by 644 days.

(21) Appl. No.: 10/559,670

(22) PCT Filed: Jul. 7, 2004

(86) PCT No.: PCT/JP2004/010006

§ 371 (c)(1),
(2), (4) Date: Dec. 6, 2005

(87) PCT Pub. No.: WO2005/002819

PCT Pub. Date: Jan. 13, 2005

(65) Prior Publication Data

US 2006/0137156 A1    Jun. 29, 2006

(30) Foreign Application Priority Data

Jul. 8, 2003   (JP) ............... 2003-193895
Feb. 12, 2004  (JP) ............... 2004-034778

(51) Int. Cl.
*D01D 11/02* (2006.01)
(52) U.S. Cl. .......................... 28/283; 28/282
(58) Field of Classification Search ............ 28/283, 28/282, 220, 271, 258, 253, 219; 19/66 T, 19/66 R; 264/211.14, 211.15, 211.17; 226/7, 226/97.4
See application file for complete search history.

(56) References Cited

U.S. PATENT DOCUMENTS

| | | | | |
|---|---|---|---|---|
| 2,244,203 A | | 6/1941 | Kern | |
| 3,505,155 A | * | 4/1970 | Balch et al. | 28/283 |
| 3,535,745 A | * | 10/1970 | Zeidman | 28/283 |
| 3,698,039 A | * | 10/1972 | Kalwaites | 28/103 |
| 3,729,777 A | * | 5/1973 | Hoffman et al. | 28/282 |
| 3,960,645 A | * | 6/1976 | Brackmann et al. | 156/441 |
| 3,961,396 A | | 6/1976 | Lubitzsch | |
| 4,179,776 A | * | 12/1979 | Wortman | 28/121 |
| 4,259,769 A | * | 4/1981 | Greve et al. | 28/283 |
| 5,042,122 A | * | 8/1991 | Iyer et al. | 28/283 |
| 5,182,839 A | * | 2/1993 | Stuart | 28/283 |
| 5,446,952 A | * | 9/1995 | Kim et al. | 28/283 |
| 6,032,342 A | * | 3/2000 | Kawabe et al. | 28/283 |

(Continued)

FOREIGN PATENT DOCUMENTS

EP     0 837 162     4/1998

(Continued)

*Primary Examiner*—Amy B Vanatta
(74) *Attorney, Agent, or Firm*—Oliff & Berridge, PLC

(57) ABSTRACT

A method of producing a spread multi-filament bundle and an apparatus is used in which an arbitrary number of multi-filament bundles of higher strength are simultaneously spread with high speed and a high-quality. A spread multi-filament bundle or sheet with the component monofilaments thereof aligned in parallel widthwise and uniformly distributed in density is produced. The respective multi-filament bundles fed from a yarn supplier or a creel are subjected to fluctuation of the tensile force applied thereto alternatively between tension and relaxation and the respective bundles as subjected to such fluctuation are passed in succession through a fluid flowing spreader.

19 Claims, 18 Drawing Sheets

U.S. PATENT DOCUMENTS 6,094,791 A * 8/2000 Akase et al. .................. 28/282
6,836,939 B2 * 1/2005 Guirman et al. ............... 28/283

FOREIGN PATENT DOCUMENTS

| | | |
|---|---|---|
| EP | 2004 585912 | 8/2004 |
| JP | 52-151362 | 12/1977 |
| JP | 56-43435 | 4/1981 |
| JP | 57-77342 | 5/1982 |
| JP | 1-282362 | 11/1989 |
| JP | 3-31823 | 5/1991 |
| JP | 11-172562 | 6/1999 |
| JP | 2003-213537 | 7/2003 |

* cited by examiner

[a]

[b]

METHOD OF PRODUCING A SPREAD MULTI-FILAMENT BUNDLE AND AN APPARATUS USED IN THE SAME

TECHNICAL FIELD

The invention relates to spreading a multi-filament bundle, in more details, pertaining to a method of mass-producing a high-quality spread multi-filament bundle and bundles sheet and an apparatus used therein wherein a multi-filament bundle comprising the number of monofilaments as desired in carriage is repeatedly put into contact with a fluid free from turbulent stream as many-times as necessary while being continuously bent in a wavy form or if required, the bundle in carriage is repeatedly subjected to the fluctuation of the tensile force applied thereto by locally and intermittently pressing the bundle in carriage crosswise with regard to the moving course of the bundle or a linearly back-and-forth friction is further provided widthwise with regard to the bundle in the process of being spread.

BACKGROUND ART

As well known, complex fiber reinforced materials comprising such reinforced fibers as carbon fibers, glass fibers and aramid fibers and such matrix resins as epoxy resin are light in weight and superb in mechanical strength and anti-erosion so that they are widely utilized for such products for the general consumers as a fishing rod and a golf rod and structural parts of industrial machinery as well as for the construction of airplanes and space rockets. For manufacturing such products and parts made from such complex fiber reinforced materials as mentioned above and constructing a fixed shape as required, such materials are generally provided in such condition that a matrix resin is impregnated between the component monofilaments of a pre-impregnation sheet made from such reinforced fibers, the improvement on uniform density and thickness of which pre-impregnation sheet is sought after due to the recent expectation for further weight reduction of such products and components of heavy construction.

The large-scale and inexpensive provision of such pre-impregnation sheet uniform in density and smaller in thickness as mentioned above enables not only thinner and lighter shaped products to be mass-produced, but also pre-impregnation sheets whose monofilaments are uni-directionally aligned to be laminated one over another with the direction of the respective sheets horizontally, vertically or diagonally displaced with regard to each other so as to obtain a multiplex pre-impregnation sheet. The production of such an article as being made from such multiplex pre-impregnation sheet as mentioned above could greatly improve rupture strength of such article. Thus, it is highly expected among the respective industrial circles that a reasonable production technology of a thinner spread multi-filaments sheet whose monofilaments are widthwise aligned in parallel and are distributed uniformly in density is established.

In this regard, reasonably producing a pre-impregnation sheet requires that a material cost of reinforced multi-filament bundles to be spread be reduced. Normally, the use of reinforced multi-filament bundle whose monofilaments are less in number with such monofilaments uni-directionally aligned facilitates the production of the pre-impregnation sheet smaller in thickness and whose monofilaments are uniformly distributed in density. However, the reinforced multi-filament bundle whose monofilaments are less in number are expensive in cost so that it is unavoidable that reinforced multi-filament bundle having a number of monofilaments should be used. Thus, it necessitates a method of spreading such reinforced multi-filament bundle having a number of monofilaments to form a thin reinforced multi-filament bundle spread sheet so as to produce a pre-impregnation sheet whose thickness is smaller and whose monofilaments are uniformly distributed in density in a cost-effective manner compared to the prior art.

Conventionally, such methods are known as spreading respective monofilaments by subjecting multi-filament bundles to circular rods, and splitting respective monofilaments widthwise by water stream or high-pressurized air stream and ultrasonically vibrating respective monofilaments bundles so as to split the same. As for some examples of such method by the circular rods, it is disclosed in Japanese Patent Application Laid-open-No. 56-43435 that the multi-filament bundles are passed through and in engagement with a revolving roller that vibrates in the axial direction thereof so as to be spread, and it is disclosed in Japanese After-Grant Patent Application Laid-open No. 3-31823 that the multi-filaments are passed through and in engagement with a plurality of rollers that are disposed in displacement by 30 degrees to 90 degrees to each other so as to be spread. Then, As for some examples of such method by water stream or high-pressurized air stream, it is disclosed in Japanese Patent Application Laid-open No. 52-151362 that the multi-filament bundles are subjected to high-pressurized fluid so as to be spread, and it is disclosed in Japanese Patent Application Laid-open No. 57-77342 that the multi-filament bundles in carriage are subjected to fluid flowing vertically with regard to the moving direction of the former to apply dispersion force by such fluid to the former so as to be spread. Further, as for an example of such ultrasonic method as mentioned above, it is disclosed in Japanese Patent Application Laid-open No. 1-282362 that the multi-filament bundles are put into contact with a circular rod ultrasonically vibrating in the axial direction thereof in a crosswise manner so as to be spread.

However, any one of the above prior arts is intended for spreading multi-filament bundles by applying physical force to the same so as to enforcedly move monofilaments comprising the same widthwise while pulling the multi-filament bundles that tend to recover their converged position. In this reason, it causes the width of spread multi-filament bundle to be made smaller than expected and the monofilaments to be damaged, fluffed and cut after all. In change, in case of such circular rod as mentioned above, enhancing the feeding, speed of the multi-filament bundle causes the friction resistance between the rod and the multi-filament bundle to be larger so as to further increase the number of monofilaments that are cut during operation while in case of such water stream as mentioned above, a larger heating energy is required for drying up the water impregnated with the monofilaments. Accordingly, conventionally, an effective way is not yet to be established to continuously and stably spread the multi-filament bundle with a higher feeding speed.

Under the above circumstances, the subject inventors have proposed in Japanese Patent No. 3049225 entitled 'Method of producing a spread fibers sheet and an apparatus used in the same' and in Japanese Patent No. 3064019 entitled 'Method of producing a spread multi-filaments sheet and an apparatus used in the same' wherein the multi-filament bundles in a flexibly bent condition are subjected to suction air flowing crosswise with regard to the moving direction of the multi-filament bundles so as to spread the respective multi-filament bundles wider whose monofilaments are uniformly distributed in density. These methods are successful in spreading the respective multi-filament bundles wider whose monofilaments are distributed in density by bending the multi-filament bundles so as to put the monofilaments comprising the same into such condition to facilitate the widthwise movement thereof without enforcement or to put the monofilaments into such condition as facilitating the same to be spread widthwise and by subjecting the monofilaments in such condition to a suction air allowing air pass through the respective adjacent monofilaments.

However, such methods as proposed by the subject inventors and mentioned above requires a spreading system in unit at least comprising a front feeder, a suction air cavity, a back feeder and a bending condition measuring sensor. Thus, in order to distribute the monofilaments more uniformly in density and spread the multi-filament bundle more widely, it is required that a series of such spreading systems be disposed in succession so as to gradually proceed with the spreading operation of the same, which results in making the total system becoming much larger-in scale and more complicated in structure while spreading operation being simultaneously performed on a number of multi-filament bundles disposed widthwise, it requires that a set of such spreading systems be arranged side by side, which results in the system as a whole being far larger in scale and by far more complicated in structure.

DISCLOSURE OF THE INVENTION

In view of the inconveniences encountered with the prior art for producing a spread multi-filament bundle, the present invention is to provide a method of efficiently producing a high-quality spread multi-filament bundle and a spread multi-filaments sheet whose monofilaments are aligned widthwise in parallel and distributed in a uniformed density and an apparatus used in the same method.

Further, the present invention is to provide a method of producing a spread multi-filament bundle that is wide enough to be used as a reinforced matrix of FRTP (Fiber Reinforced Thermoplastics) and FRP (Fiber Reinforced Plastics) products and between whose adjacent monofilaments a high-viscosity fusible thermoplastic resin is smoothly and uniformly impregnated and an apparatus used in the same method.

Further, the present invention is to provide a method of economically producing a spread multi-filament bundle larger in width enabling such converged monofilaments of higher strength as carbon fibers, glass fibers, ceramic fibers, aromatic polyamide fibers and so forth in a space-saving and cost-saving manner and an apparatus used in the same method.

Furthermore, the present invention is to provide a method and an apparatus used in the same enabling an arbitrary number of multi-filament bundles of higher strength to be simultaneously spread in a high-speed operation and with ease.

The methodical and mechanical means adopted herein for solving the above issues are described below with reference to the accompanying drawings.

Firstly, the 'method of producing a spread multi-filament bundle' according to the invention is characterized in that a multi-filament bundle Tm fed from a yarn supplier 11 (bobbin, cone, cheese and so forth) is passed through in suspension a plurality of fluid flowing portions 31a, 31b, 31c and so on respectively of the fluid flowing spreader 3 provided in series along the moving course of the bundle Tm to be subjected to fluidal resistance so as to bend towards the direction to which a fluid flows and such fluid flows through an interstice formed between the adjacent monofilaments of the bundle whose bonding of the adjacent monofilaments thereof being slackened due to such fluidal resistance so as to widen such interstice between the adjacent monofilaments thereof, thereby, further promoting spreading operation oh the bundle, wherein the bundle Tm to be subjected to such spreading operation is passed through in succession the fluid flowing portion 31a located at an upstream side and the respective fluid flowing portions 31b and 31c and so forth located at a downstream side so as to gradually enlarge contact area between the bundle Tm and such fluid, thereby, widely spreading the bundle Tm in a progressive manner.

Then, the 'method of producing a spread multi-filament bundle' according to the invention is characterized in that the tensile force applied to a multi-filament bundle in carriage is fluctuated alternatively and repeatedly between tension and relaxation by locally and intermittently pressing a multi-filament bundle Tm fed from a yarn supplier 11 widthwise with regard to the bundle Tm and the bundle Tm under such fluctuation is passed through in suspension a plurality of fluid flowing portions 31a, 31b, 31c and so-on respectively of the fluid flowing spreader 3 provided in series along the moving course of the bundle Tm to be subjected to fluidal resistance so as to bend towards the direction to which a fluid flows, and such fluid flows through an interstice formed between the adjacent monofilaments of the bundle whose bonding is slackened due to such fluidal resistance so as to widen such interstice between the adjacent monofilaments thereof, thereby, further promoting spreading operation on the bundle, wherein the bundle Tm to be subjected to such spreading operation is passed through in succession the fluid flowing portion 31a located at an upstream side and the respective fluid flowing portions 31b and 31c and so forth located at a downstream side so as to gradually enlarge contact area between the bundle Tm and such fluid, thereby, widely spreading the bundle Tm in a progressive manner. Commenting further, spreading operation is more effectively performed by feeding the multi-filament bundle Tm unwound from the yarn supplier 11 with the restrain of being drawn back and changing the tensile force applied to the bundle Tm in carriage alternatively and repeatedly between tension and relaxation by locally and intermittently pressing the bundle Tm in carriage widthwise with regard to the bundle Tm, which operation is by far more effectively performed by providing linearly back-and-forth friction widthwise with regard to the spread bundle Ts discharged from the farthest fluid flowing portion 31c.

Then, the 'method of producing a spread multi-filament bundle' according to the invention is characterized in that a number of bundles Tm•Tm . . . that are unwound from the respective yarn suppliers 11•11 . . . of a creel 1 are fed with aligned in parallel in the same plane while the respective bundles Tm•Tm . . . in feed are passed through in suspension a plurality of fluid flowing portions 31a, 31b, 31c and so on respectively of the fluid flowing-spreader 3 provided in series along the moving course of the respective bundles Tm to be subjected to fluidal resistance so as to bend towards the direction to which a fluid flows, and such fluid flows through an interstice formed between the adjacent monofilaments of the respective bundles-whose bonding is slackened due to such fluidal resistance so as to widen such interstice between the adjacent monofilaments thereof, thereby, further promoting spreading operation on the respective bundles so as to be formed into the respective spread bundles Ts, and the tensile force applied to the respective spread bundles Ts in carriage is fluctuated alternatively and reciprocally between tension and relaxation by locally and intermittently pressing a group of the respective spread bundles Ts moving in the same direction widthwise with regard to the respective spread bundles Ts so as to further promote spreading operation by the respective fluid flowing portions 31a, 31b, 31c and so forth.

Further, the 'method of producing a spread multi-filament bundle' according to the invention is characterized in that a number of bundles Tm•Tm . . . that are unwound from the respective yarn suppliers 11•11 . . . of a creel 1 are fed with aligned in parallel in the same plane while the respective bundles Tm•Tm . . . in feed are passed through in suspension a plurality of fluid flowing portions 31a, 31b, 31c and so on respectively of the fluid flowing spreader 3 provided in series along the moving course of the respective bundles Tm to be subjected to fluidal resistance so as to bend towards the direction to which a fluid flows, and such fluid flows through an interstice formed between the adjacent monofilaments of the respective bundles whose bonding is slackened due to such fluidal resistance so as to widen such interstice between the adjacent monofilaments thereof, thereby, further promoting spreading operation on the respective bundles so as to be formed into the respective spread bundles Ts, and linearly back-and-forth friction is provided widthwise with regard to a group of the respective spread bundles Ts moving in the same plane to tangentially align the fringe side monofilaments of any adjacent spread bundles Ts and Ts so as to be formed into a spread multi-filament bundles sheet Tw whose monofilaments as a whole are uniformly distributed in density. Commenting further, spreading operation is more effectively performed by fluctuating the tensile force applied to the respective spread bundles Ts in carriage alternatively between tension and relaxation by locally and intermittently pressing a group of the respective spread bundles Ts widthwise with regard to the respective spread bundles prior to being subjected to the back-and-forth friction widthwise with regard to the respective spread bundles.

Further, the 'method of producing a spread multi-filament bundle' according to the invention is characterized in the provision of a floating control bridge 35 in the respective fluid flowing portions 31a, 31b, 31c and so forth that serves to secure a certain bending degree of the respective bundles in passage.

Then, the 'apparatus for spreading a multi-filament bundle used in the above method' according to the invention that is adopted as a mechanical means for solving the above issues is characterized in comprising a yarn supplier 11 such as bobbin, cone, cheese and so forth) or a creel provided with a number of such yarn suppliers 11 around which a multi-filament bundle Tm is wound; a multi-filament bundle feeder 2 to unwind and feed the bundle Tm or the respective bundles Tm•Tm . . . under a certain tensile force from the yarn supplier 11 or the creel 1 with the drawing-back of the bundle Tm or the respective bundles Tm•Tm . . . in check; a fluid flowing system 3 comprising fluid flowing portions 31a, 31b, 31c and so forth that are disposed in succession along the moving course of the bundle Tm or the respective bundles Tm•Tm . . . in feed to put a fluid into contact crosswise with regard to and pass the fluid through the bundle Tm or the respective bundles Tm•Tm . . . in passage with the latter supported thereon in suspension and to bend the bundle Tm or the respective bundles Tm•Tm . . . towards the direction to which such fluid flows so as to spread the same; a tensile force variable system 4 (refer to FIG. 3) to change the tensile force applied to the bundle or the respective bundles in carriage alternatively between tension and relaxation.

Further, the 'apparatus for spreading a multi-filament bundle used in the above method' according to the invention that is adopted as a mechanical means for solving the above issues is characterized in comprising a yarn supplier 11 or a creel provided with a number of such yarn suppliers 11 around which a multi-filament bundle Tm is wound; a bundle feeder 2 to unwind and feed the bundle Tm or the respective bundles Tm•Tm . . . under a certain tensile force from the yarn supplier 11 or the creel 1 with the drawing-back of the bundle Tm or the respective bundles Tm•Tm . . . in check; a fluid flowing system 3 comprising fluid flowing portions 31a, 31b, 31c and so forth that are disposed in succession along the moving course of the bundle Tm or the respective bundles Tm•Tm . . . in feed to put a fluid into contact crosswise with regard to and pass the fluid through the bundle Tm or the respective bundles Tm•Tm . . . with the latter supported thereon and to bend the bundle Tm or the respective bundles Tm•Tm . . . towards the direction to which such fluid flows so as to spread the same; a tensile force variable system 4 to change the tensile force applied to the bundle or the respective bundles in feed alternatively between tension and relaxation and a widthwise back-and-forth friction system 6 to move back and forth widthwise with regard to the bundle Tm or the respective bundles Tm in the process of being spread in abutment with the respective monofilaments comprising the bundle Tm or the respective bundles Tm to apply friction to the respective monofilaments thereof.

Now, several supplemental follow-ups of the present invention are described below in terms of the technical matters of the present invention.

(1) although the multi-filament bundle that the present invention encompasses is mainly of such conventionally known monofilaments of higher strength as carbon fiber, glass fiber, ceramic fiber, polyoxymethylene fiber, polyamide fiber and so forth that are used as reinforced matrix of FRTP (Fiber Reinforced Thermoplastics) and FRP (Fiber Reinforced Plastics) products being converged into a multi-filament bundle, the present invention also covers a multi-filament bundle in which a number of metallic monofilaments or conventionally known synthetic monofilaments are converged into a multi-filament bundle and could encompass every types of multi-filament bundles as necessary other than those mentioned above on a case-on-case basis.

(2) then, as for the type of fluid in use for acting on a multi-filament bundle so as to spread the bundle in contact therewith, it includes a kinetic energy generated by gas flow such as air and vapor, that generated by liquid flow such as water and others or that generated by liquid-gas two-phase flow.

(3) as for fluid flowing portions 31a, 31b, 31c, 31d and so on comprising a fluid flowing system 3, the fluid velocity of the respective portions may be equal or different. For example, there may be difference in the fluid velocity among the respective flowing portions from higher velocity to smaller velocity or vice versus. According to the progress of a multi-filament bundle being spread, the most efficient fluid velocity thereof may be selected.

(4) to note, in the present invention, the tensile force applied to a multi-filament bundle Tm and the fluid velocity shall be fixed in considerations of the physical property and the moving speed of the multi-filament bundle in use, since the respective monofilaments comprising the bundle are supposed to move widthwise to be spread and to flexibly bend, when the multi-filament bundle Tm passes in suspension through the fluid flowing portions 31a, 31b, 31c, 31d and so on disposed in series along the moving course of the bundle Tm. Too strong tensile force being applied to the respective bundles and the flowing velocity of a fluid being too slow causes the respective bundles to pass over the respective fluid flowing portions without bending towards the direction to which the fluid flows, which results in failing to perform spreading operation smoothly.

Effect

As described up to here, the invention makes most of such fluid dynamism as the respective multi-filament bundles unwound and fed from the creel at the same speed with aligned in parallel in the same plan being subjected to fluidal resistance while passing over in suspension a plurality of fluid flowing portions disposed in succession along the moving course of the respective bundles comprising a fluid flowing spreader so as to be bent towards the fluid flowing direction, through any adjacent monofilaments of which bundles respectively as subjected to such fluidal resistance and slackened the fluid in use flows, so that an ideal widely spread multi-filaments sheet with the side fringe monofilaments of any adjacent bundles tangentially aligned in parallel and uniform in density is efficiently mass-produced.

The invention adopts such mechanism as either one multi-filament bundle or a plurality of multi-filament bundles fed from a supplier or a creel with the restraint of being drawn back being subjected to the change of the tensile force applied thereto between tension and relaxation and the bundle or the respective bundles being subjected to fluidal resistance while passing over a plurality of fluid flowing portions disposed in line along the moving course thereof so as to be bent towards the fluid flowing direction, through any adjacent monofilaments of which bundle or bundles respectively subjected to such fluidal resistance and slackened the fluid flows. Thus, spreading operation is performed with high efficiency both for producing spread multi-filament bundles and for producing an ideal widely spread multi-filaments sheet with the fringe side monofilaments of any adjacent bundles tangentially aligned in parallel and uniform in density.

The adoption of the means to provide back-and-forth linearly friction widthwise with regard to the respective multi-filament bundles in the process of being spread and subjected to the change of the tensile force between tension and relaxation permits spread multi-filament bundles or a widely spread multi-filaments sheet to be produced with less damage on the component monofilaments thereof and with the component monofilaments thereof distributed uniformly as a whole. Thus, a high-quality spread multi-filaments sheet, which is wide enough to use as a reinforced material for an article made from FRP and FRTP and is good at resin permeability enabling a fusible thermoplastic resin of high viscosity to be uniformly and smoothly impregnated between the component monofilaments thereof, is provided in an inexpensive way.

By use of such an extremely streamlined apparatus as essentially consisting of a creel provided with a yarn supplier or a plurality of yarn suppliers, a multi-filament bundle supplier, a fluid flowing spreader provided with a plurality of fluid flowing portions and a tensile force variable system to change the tensile force applied to the respective multi-filament bundles alternatively between tension and relaxation, a multi-filament bundle comprising carbon fibers, ceramic fibers, polyoxymethylene fibers, aromatic polyamide resin and so forth is processed into a high-quality widely spread multi-filaments in a space-saving and cost-saving manner with high efficiency.

BRIEF DECSRIPTION OF THE DRAWINGS

Figure 4:
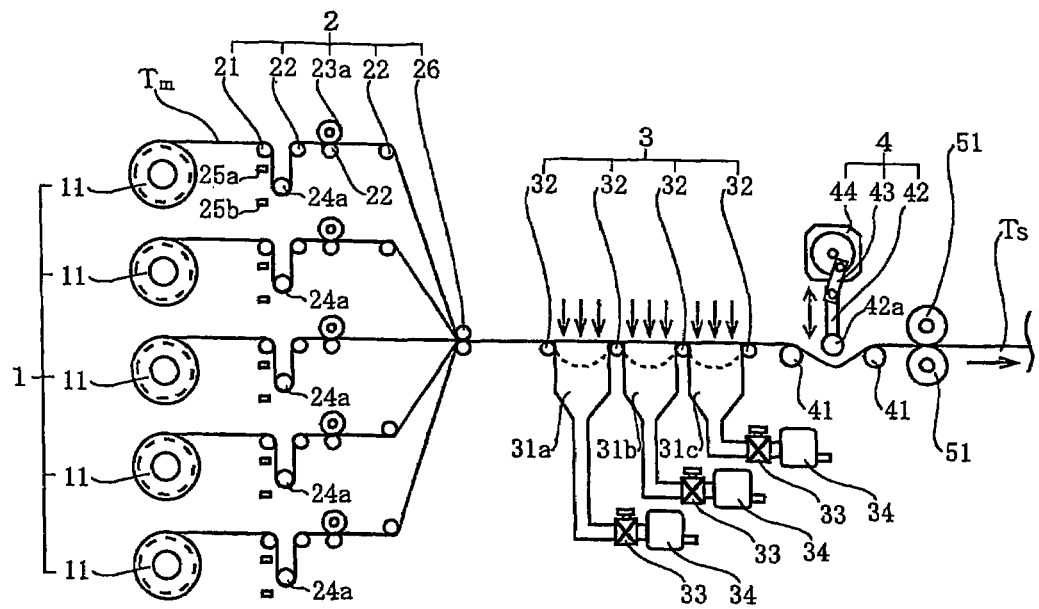
Figure 5:
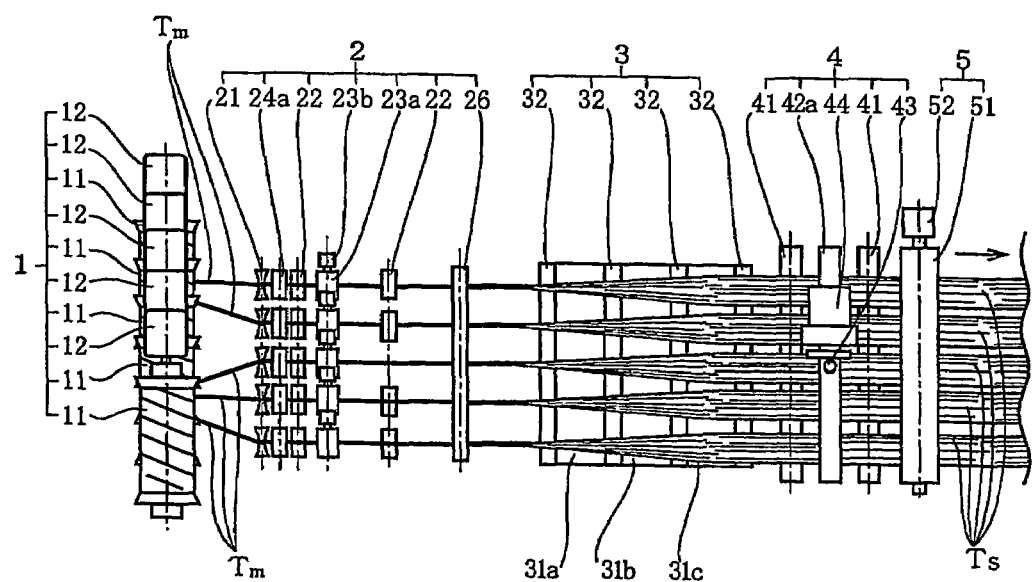
Figure 6:
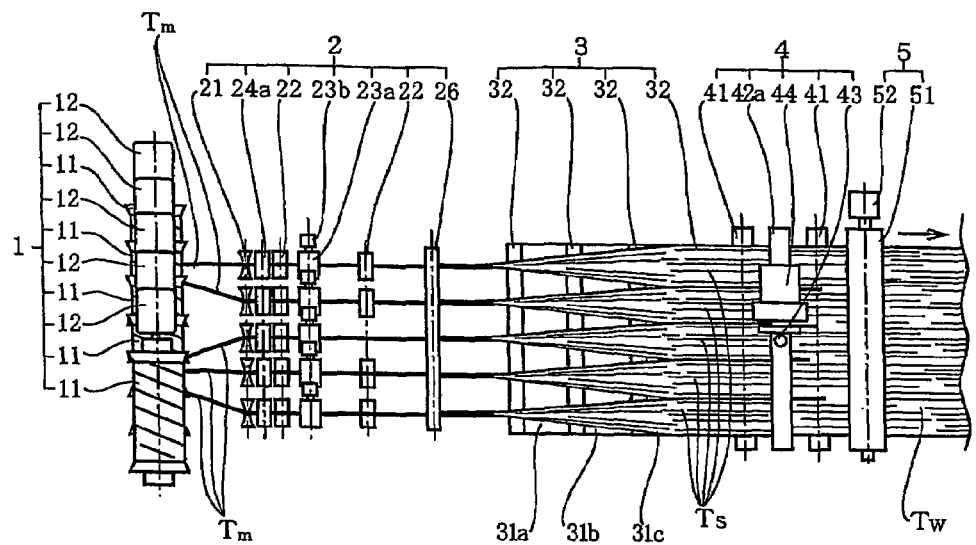
Figure 7:
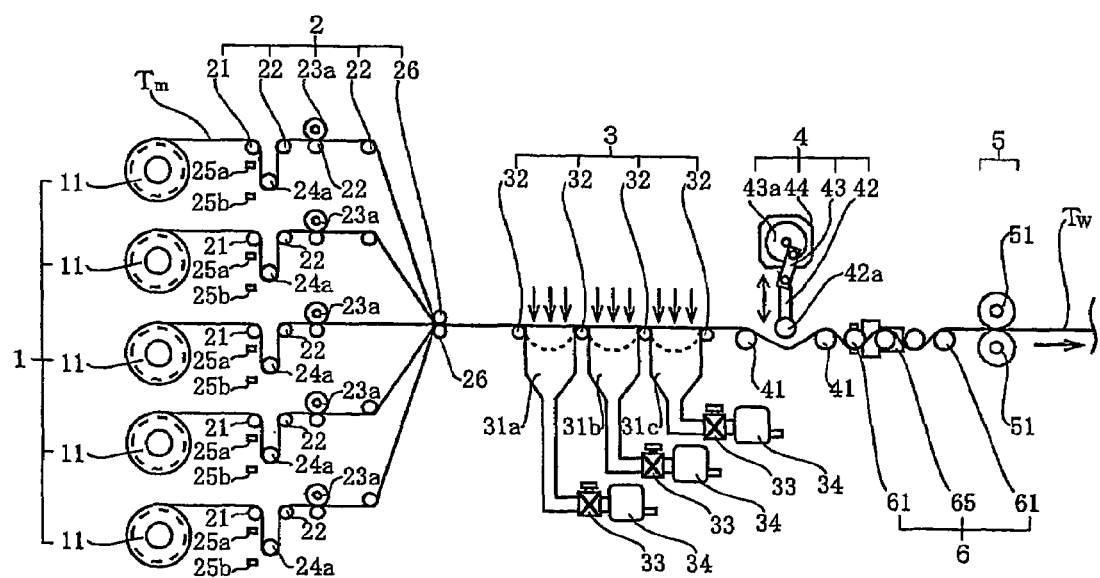
Figure 8:
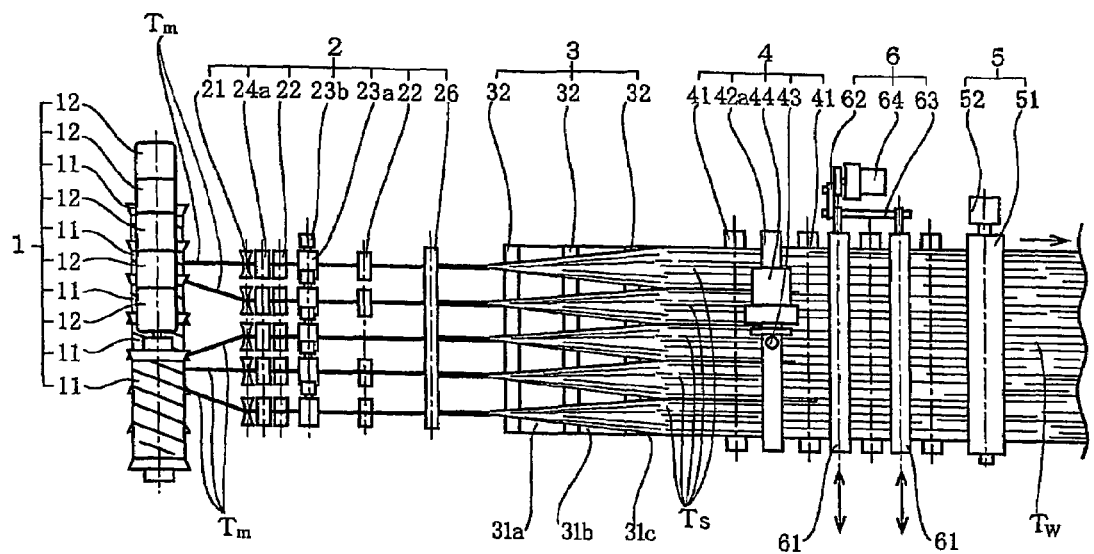
Figure 9:
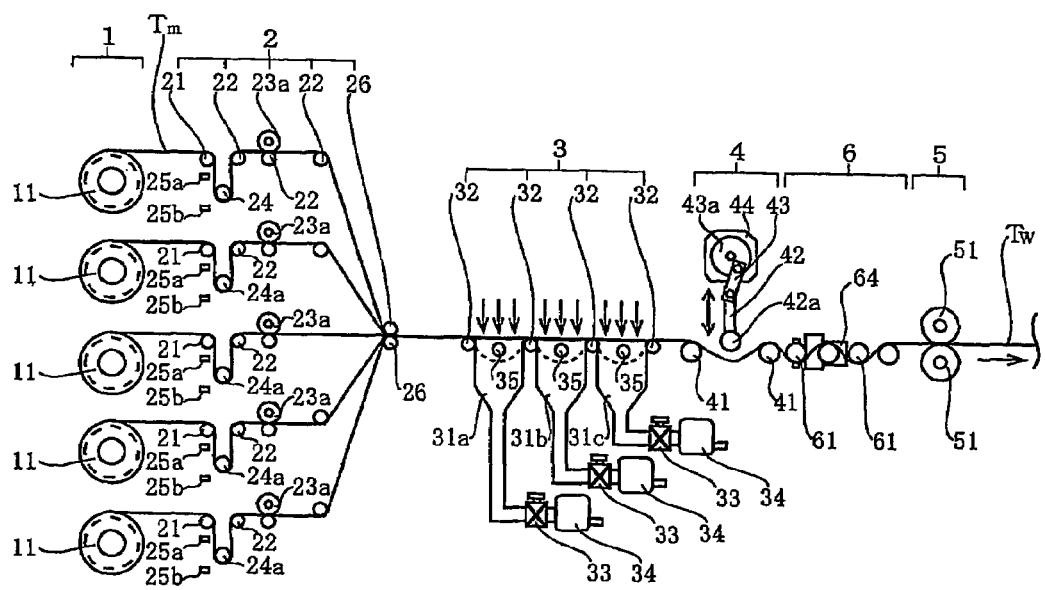
Figure 10:
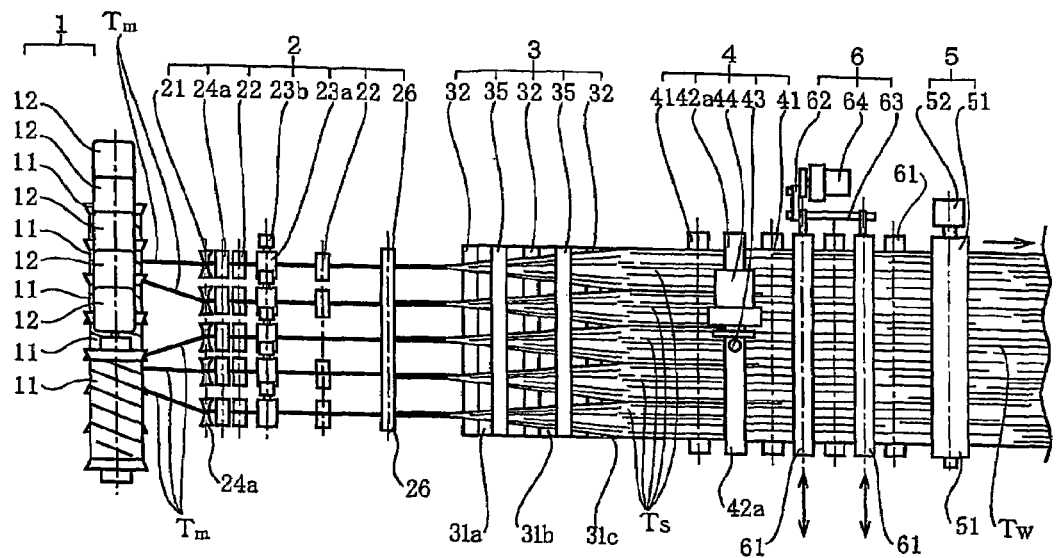
Figure 11:
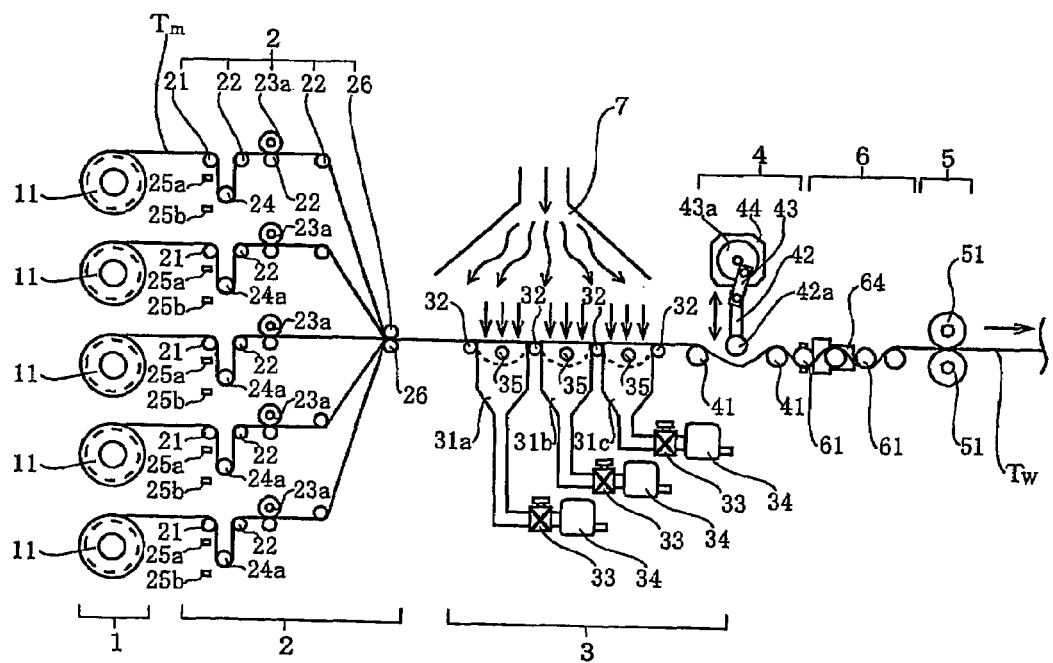
Figure 12:
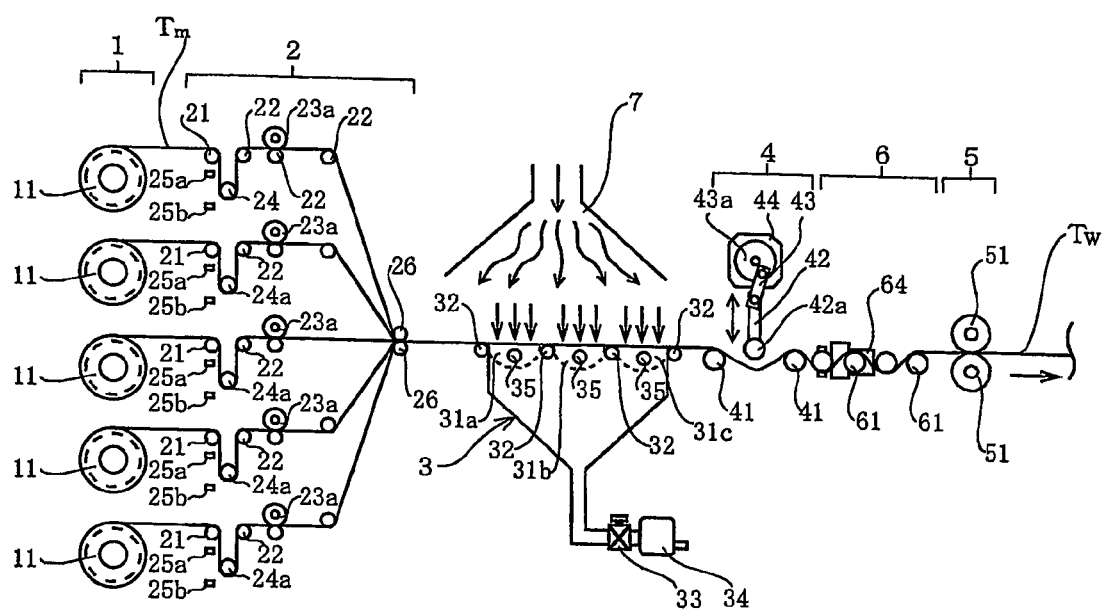
Figure 13:
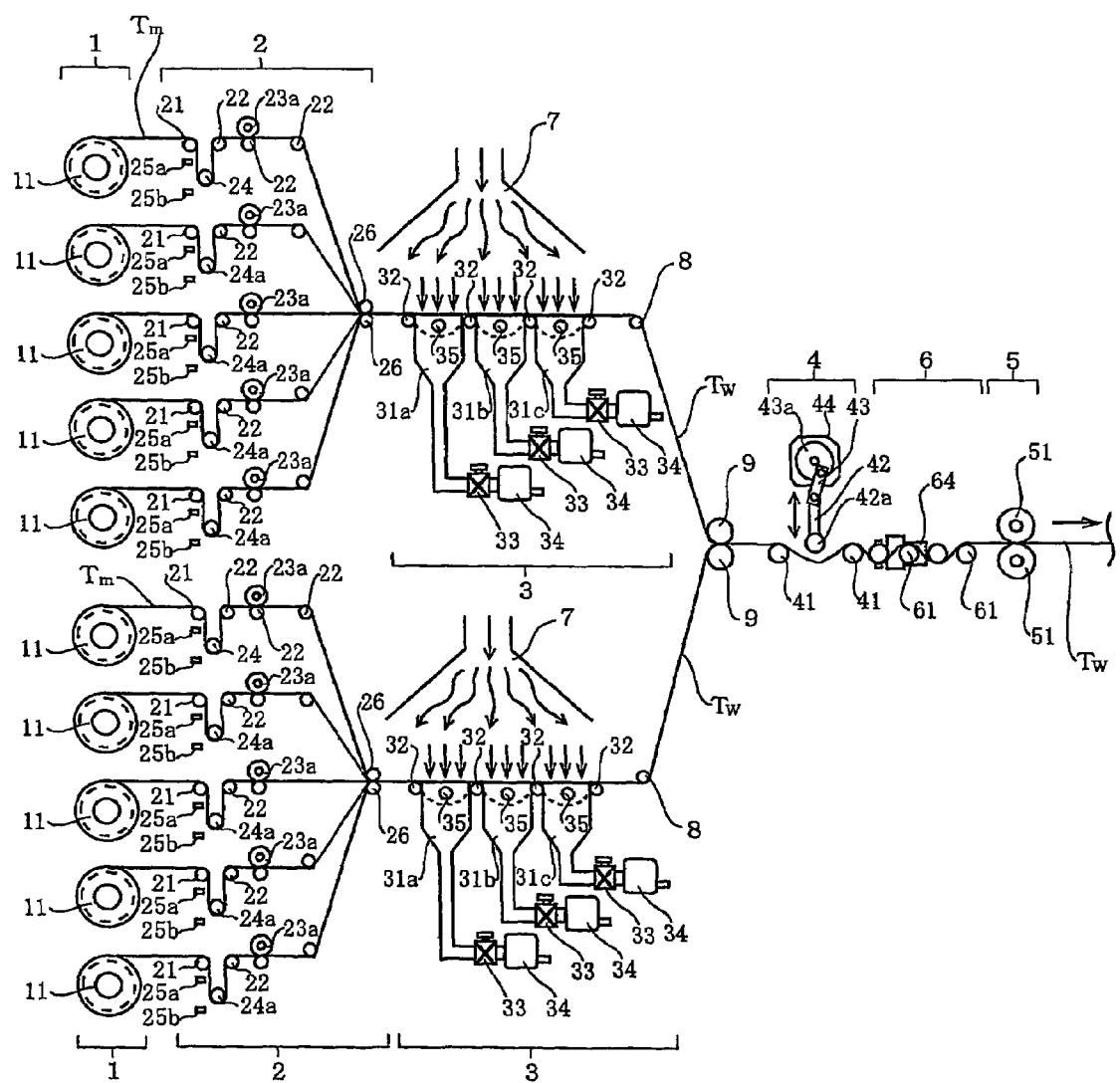
Figure 14:
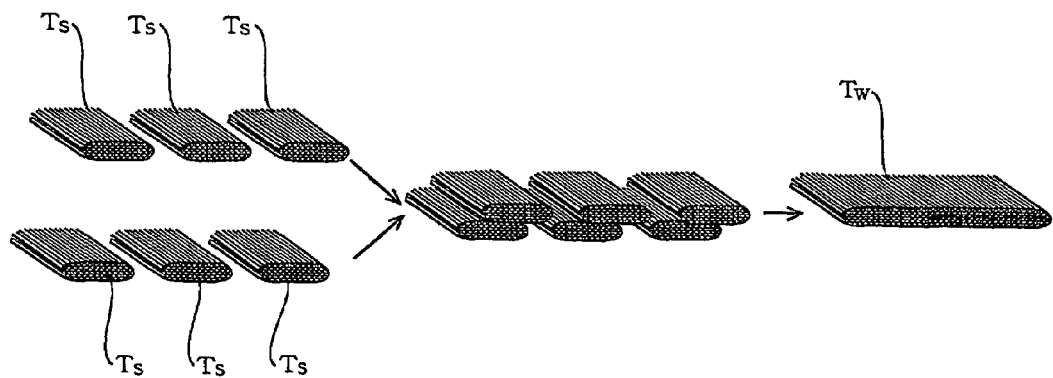
Figure 15:
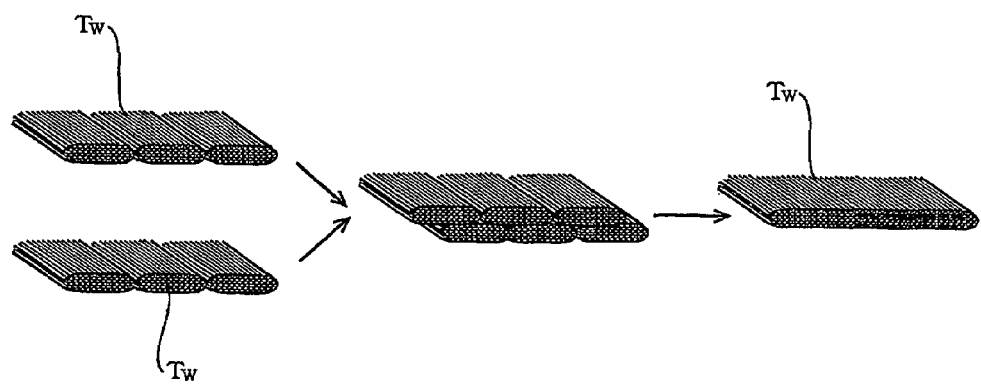
Figure 16:
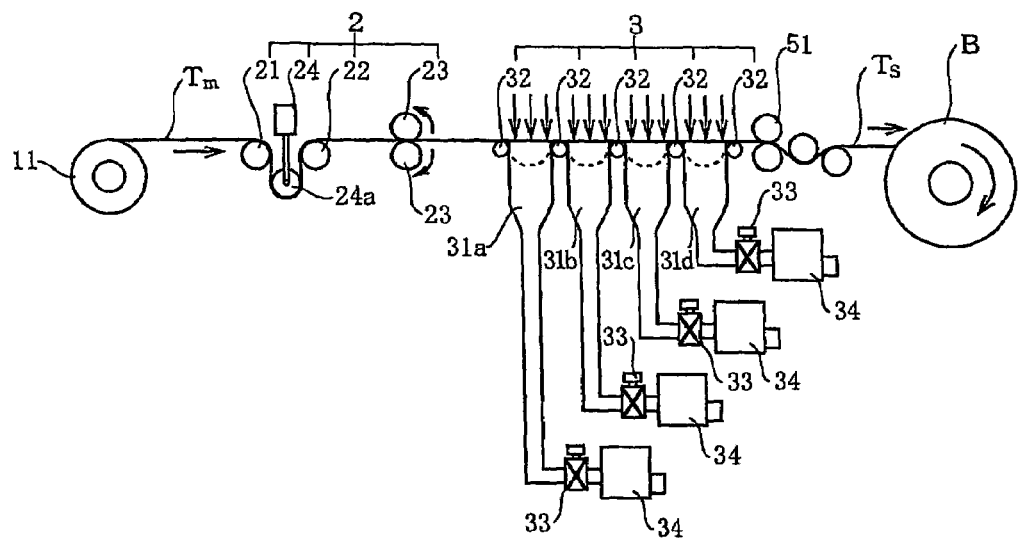
Figure 17:
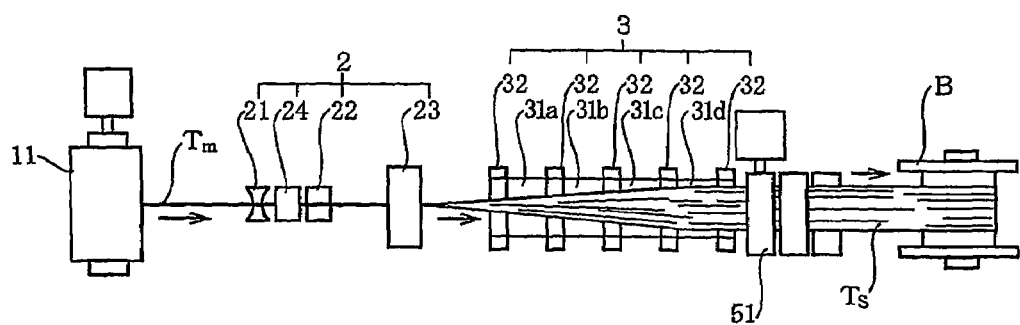
Figure 18:
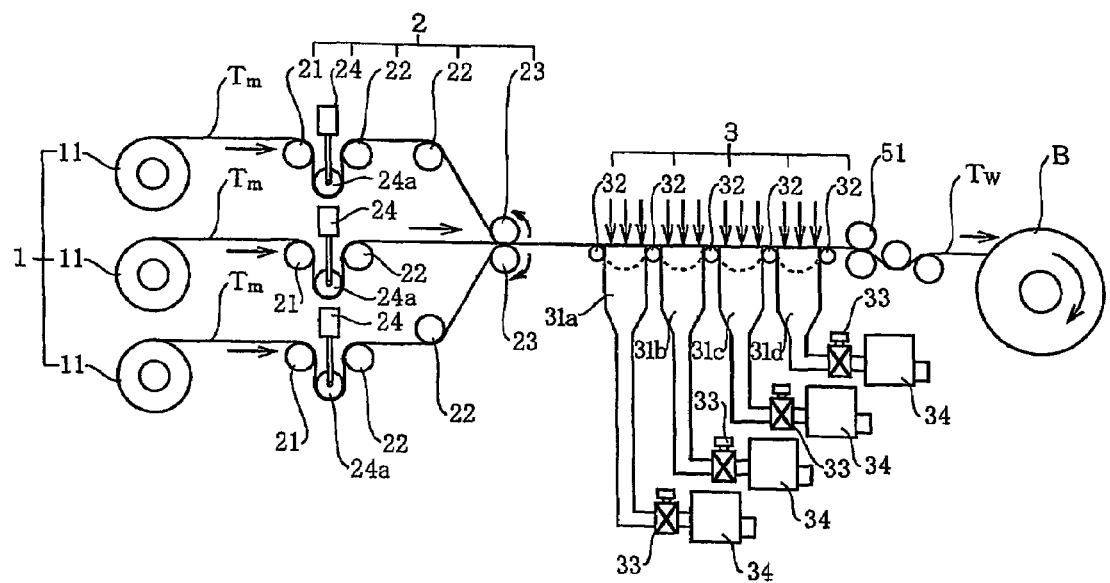
Figure 19:
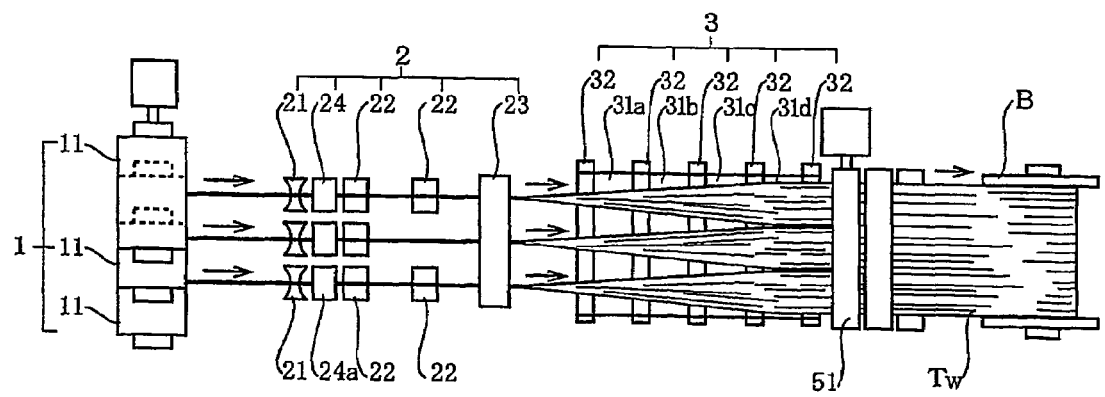
Figure 20:
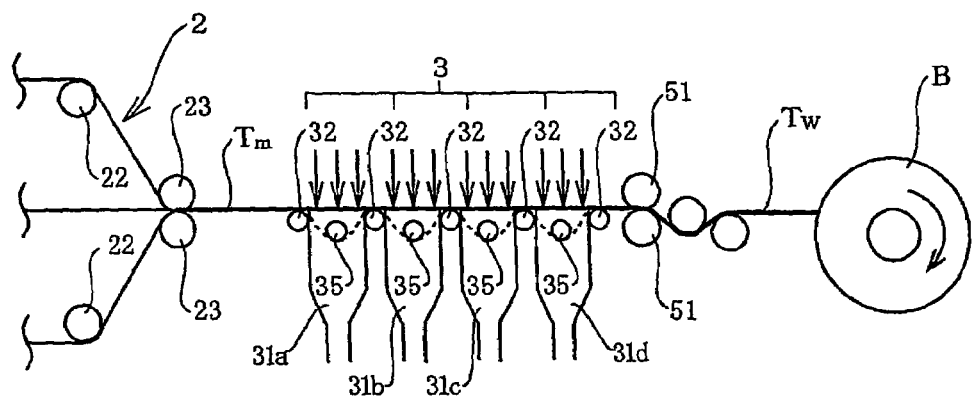
Figure 21:
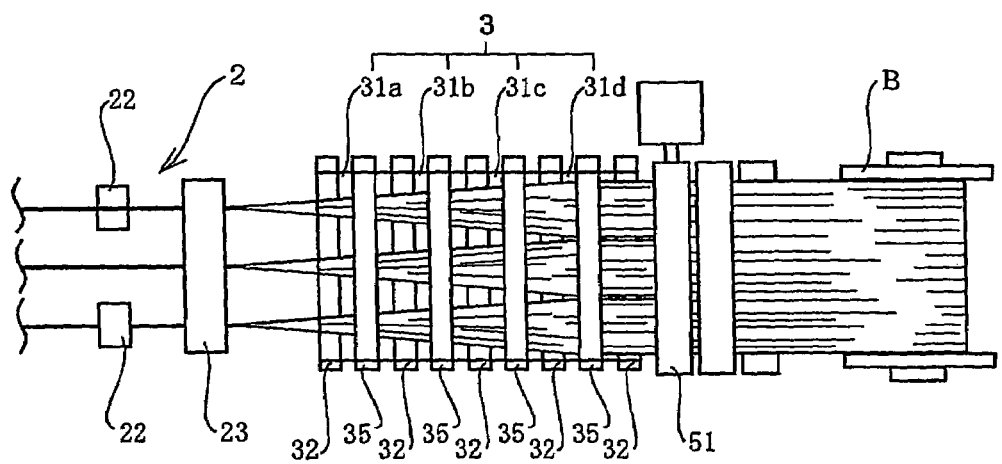
Figure 22:
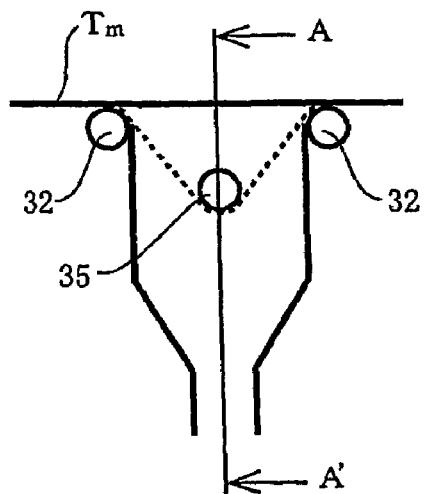
Figure 23:
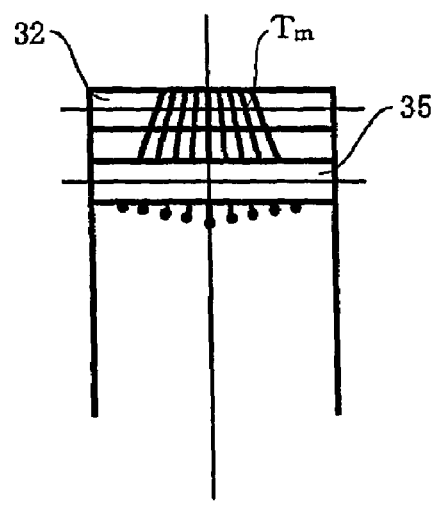
Figure 24:
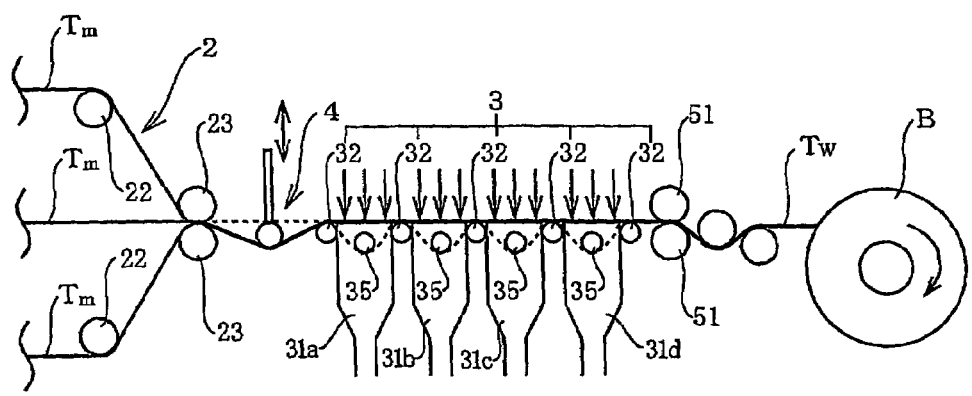
Figure 25:
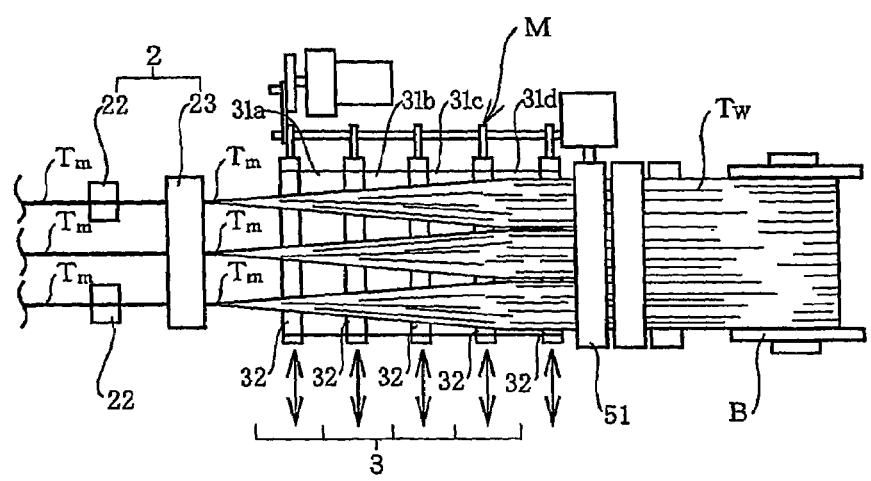
Figure 26:
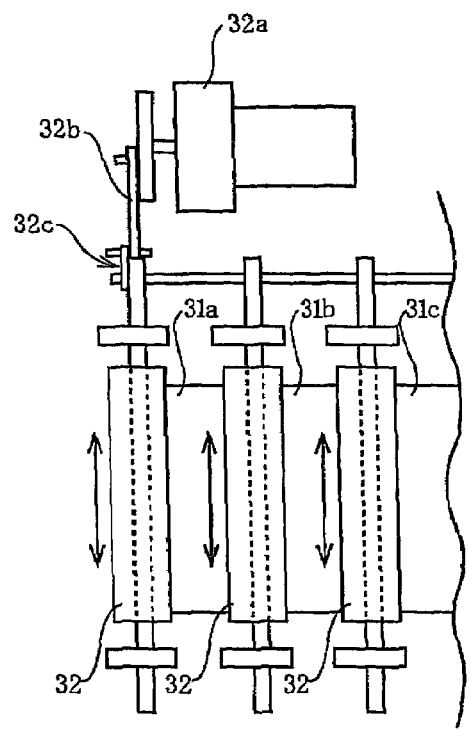
Figure 27:
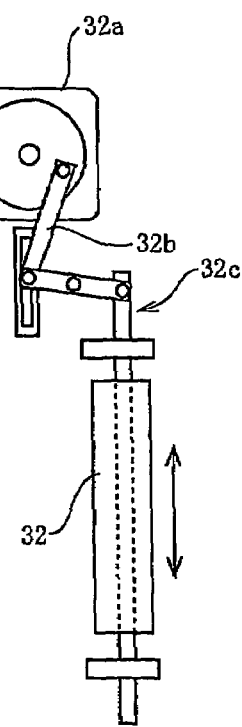
Figure 28:
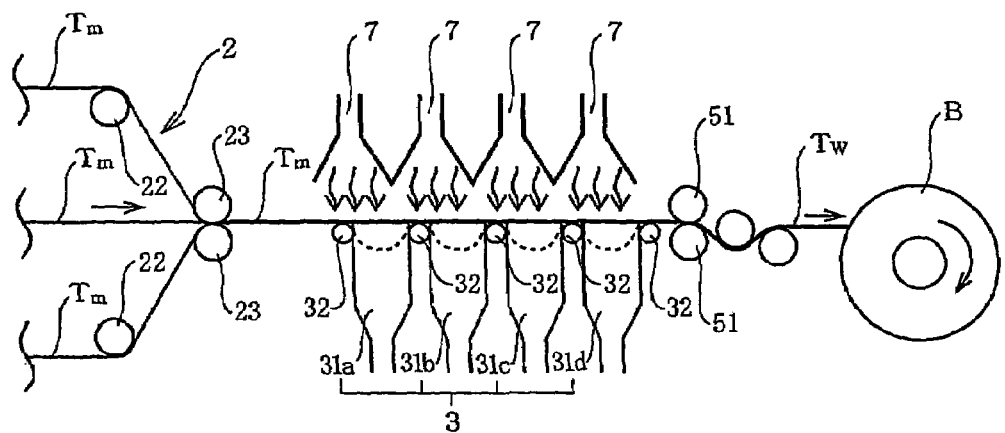
Figure 29:
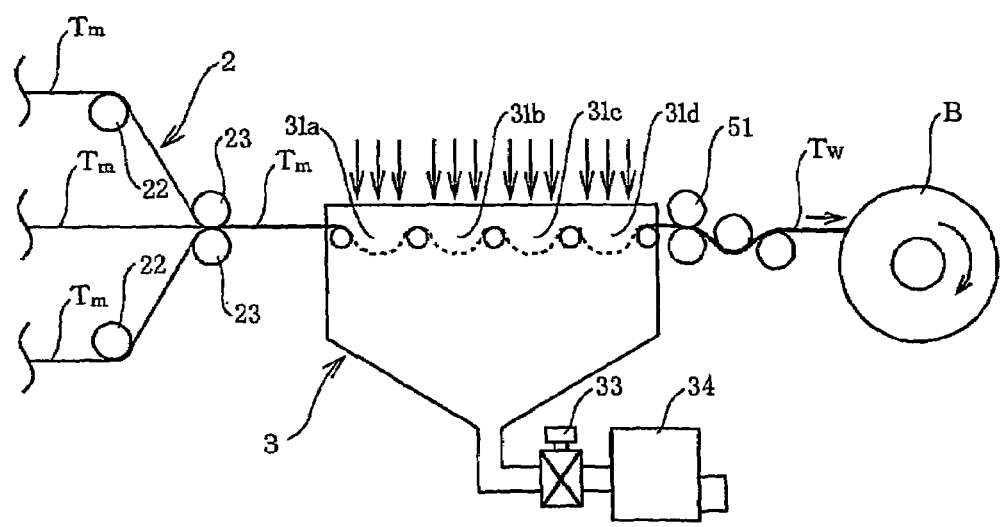
Figure 30:
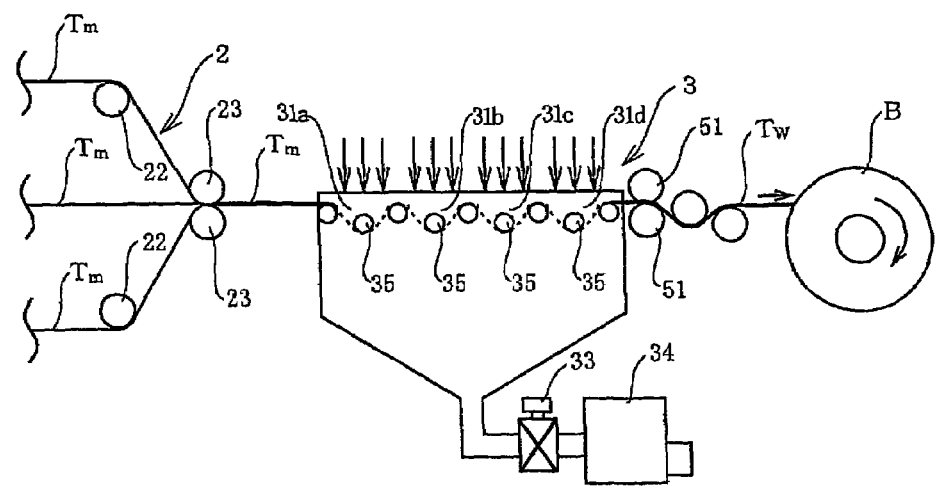
Figure 31:
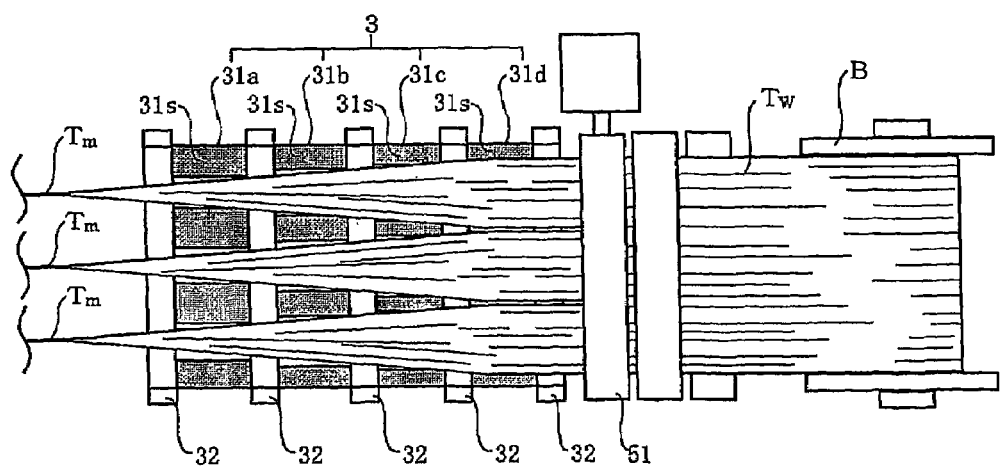
Figure 32:
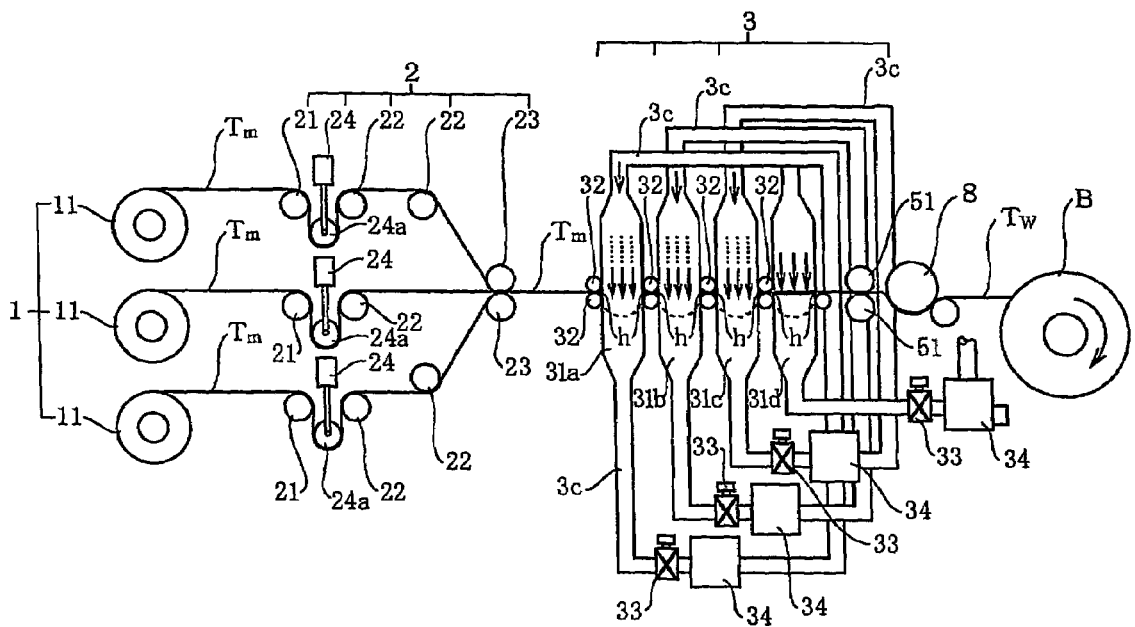
Figure 33:
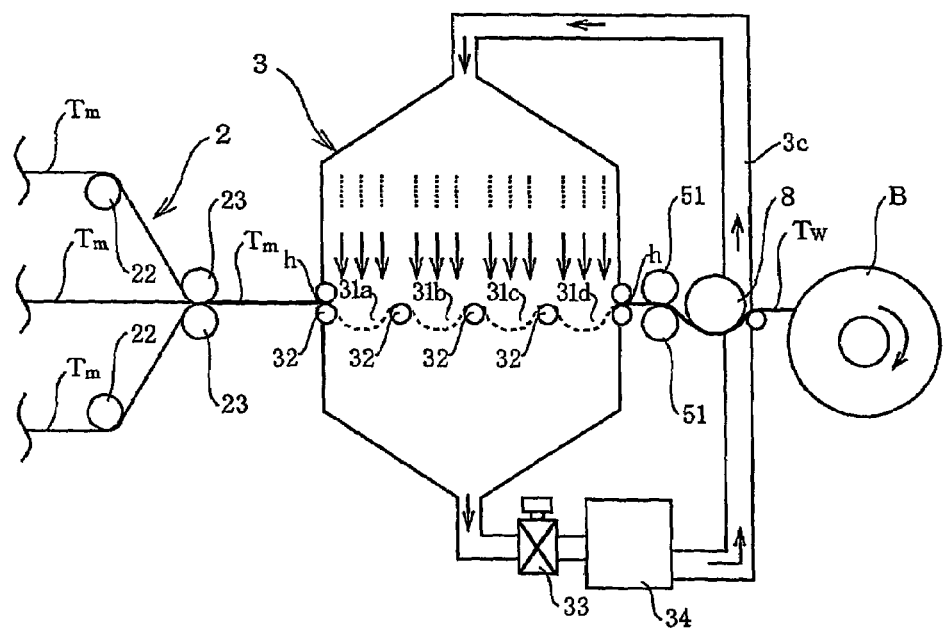
Figure 34:
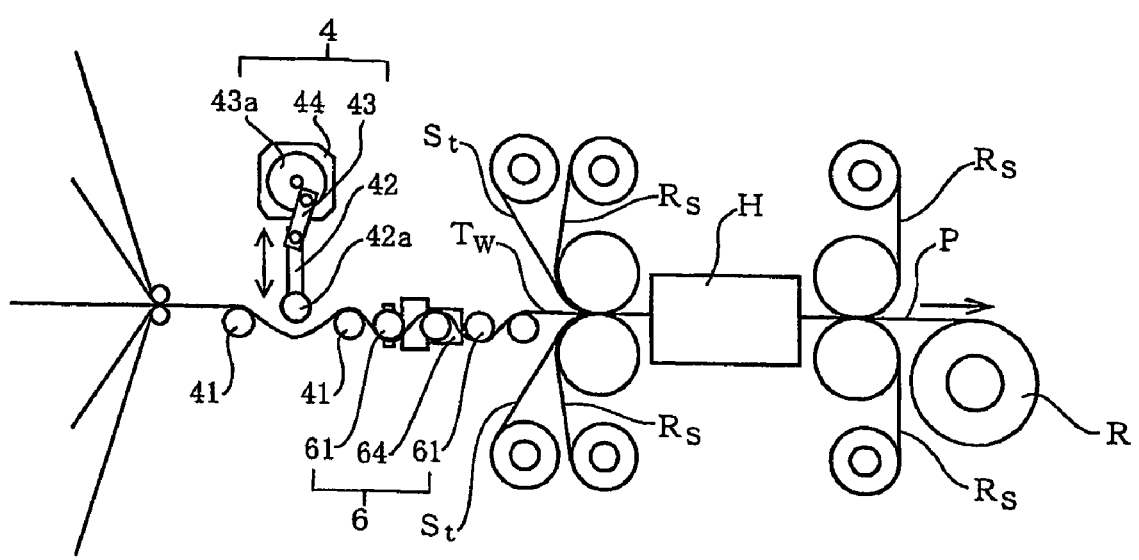

FIGS. 3(a) and (b) are illustrations to show the effect on the multi-filament bundle passing through the fluid flowing portions according to the operation of the tensile force variable system;

FIG. 4 is an explanatory side view of an apparatus example 2 used in the method of producing a spread multi-filament bundle according to the second embodiment hereof;

FIG. 5 is an explanatory plan view of the apparatus example 2 shown in FIG. 4;

FIG. 6 is an explanatory plan view of the apparatus example 2 used in the method of producing a spread multi-filament bundle according to the third embodiment hereof;

FIG. 7 is an explanatory side view of an apparatus example 3 used in the method of producing a multi-filament bundle according to the third embodiment hereof;

FIG. 8 is an explanatory plan view of the apparatus example 3 shown in FIG. 7;

FIG. 9 is an explanatory side view of an apparatus example 4 used in the method of producing a multi-filament bundle according to the third embodiment hereof;

FIG. 10 is an explanatory plane view of the apparatus example 4 shown in FIG. 9;

FIG. 11 is an explanatory side view of an apparatus example 5 used in the method of producing a multi-filament bundle according to the third embodiment hereof;

FIG. 12 is an explanatory side view of an apparatus example 6 used in the method of producing a spread multi-filament bundle according to the third embodiment hereof;

FIG. 13 is an explanatory side view of an apparatus example 7 used in the method of producing a spread multi-filament bundle according to the fourth embodiment hereof;

FIG. 14 comprises illustrations showing the state where the spread multi-filament bundles are overlapped one over another and proceed to be formed into a spread multi-filaments sheet according to the fourth embodiment hereof;

FIG. 15 comprises illustrations showing the state where the spread multi-filaments sheets are overlapped one over another so as to be formed into a commingled spread multi-filaments sheet;

FIG. 16 is an explanatory side view of an apparatus example 8 used in the method of producing a spread multi-filament bundle according to the fifth embodiment hereof;

FIG. 17 is an explanatory plan view of the apparatus example 8 shown in FIG. 16;

FIG. 18 is an explanatory side view of an apparatus example 9 used in the method of producing a spread multi-filament bundle according to the sixth embodiment hereof;

FIG. 19 is an explanatory plan view of the apparatus example 9 shown in FIG. 18;

FIG. 20 is an explanatory side view of another apparatus example 10 used in the method of producing a spread multi-filament bundle according to the sixth embodiment hereof;

FIG. 21 is an explanatory plan view of the apparatus example 10 shown in FIG. 20;

FIG. 22 is an enlarged view of the internal structure of the fluid flowing portion of the apparatus example 10;

FIG. 23 is a sectional view taken along A-A of FIG. 22;

FIG. 24 is an explanatory side view of another apparatus example 11 used in the method of producing a spread multi-filament bundle according to the sixth embodiment hereof;

FIG. 25 is an explanatory side view of another apparatus example 12 used in the method of producing a spread multi-filament bundle according to the sixth embodiment hereof;

FIG. 26 is an enlarged plan view showing the linkage relation among guide rollers, a crank motor, a crank arm and a linkage mechanism comprising a widthwise back-and-forth friction system of the apparatus example 12 shown in FIG. 25;

FIG. 27 is a structural view showing the mechanism in which the rotary-motion of the crank motor is converted into a widthwise back-and-forth movement transmitted to guide rollers;

FIG. 28 is an explanatory side view of another apparatus example 13 used in the method of producing a spread multi-filament bundle according to the sixth embodiment hereof;

FIG. 29 is an explanatory side view of another apparatus example 14 used in the method of producing a spread multi-filament bundle according to the sixth embodiment hereof;

FIG. 30 is an explanatory side view of another apparatus example 15 used in the method of producing a spread multi-filament bundle according to the sixth embodiment hereof;

FIG. 31 is an explanatory side view of another apparatus example 16 used in the method of producing a spread multi-filament bundle according to the sixth embodiment hereof;

FIG. 32 is an explanatory side view of an apparatus example 17 used in the method of producing a spread multi-filament bundle according to the seventh embodiment hereof;

FIG. 33 is an explanatory side view of another apparatus example 18 used in the method of producing a spread multi-filament bundle according to the seventh embodiment hereof; and FIG. 34 shows a modified example of the third embodiment hereof in which a resin sheet is fused onto the upper and bottom surfaces respectively of the spread multi-filaments sheet so as to produce a pre-imagination sheet.

BEST MODE FOR CARRYING OUT THE INVENTION

Hereafter, the preferred embodiments of the invention are described in more details with reference to the accompanying drawings.

First Embodiment

Figure 1:
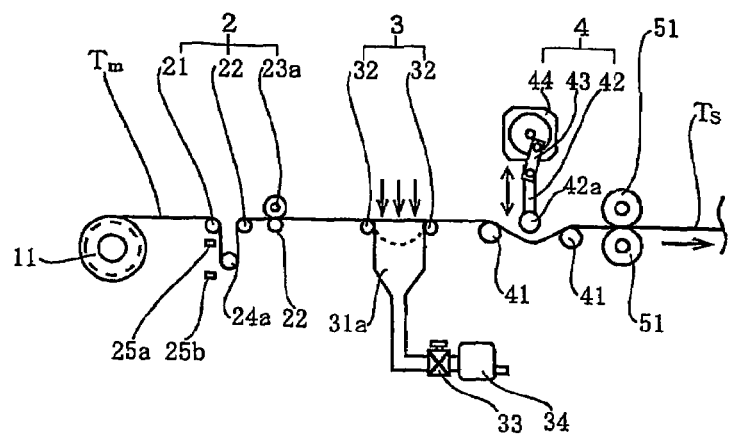
FIG. 1 is an explanatory side view of an apparatus example 1 used in the method of producing a spread multi-filament bundle according to the first-embodiment hereof.
Figure 2:
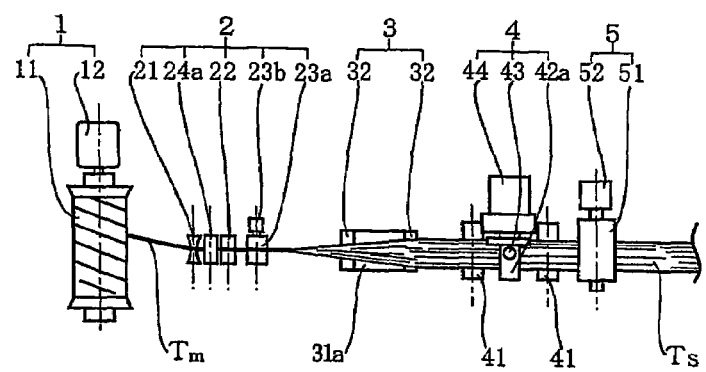
FIG. 2 is an explanatory plan view of the apparatus example 1 shown in FIG. 1.
Figure 3:
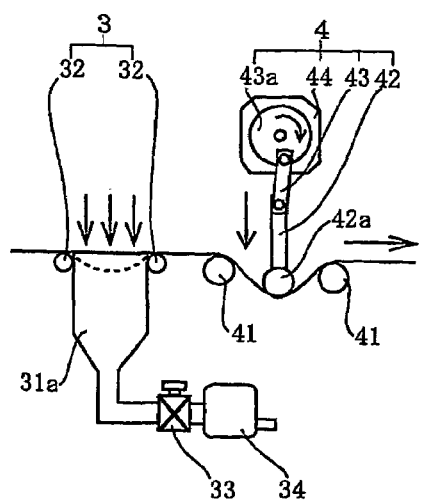
Figure 3:
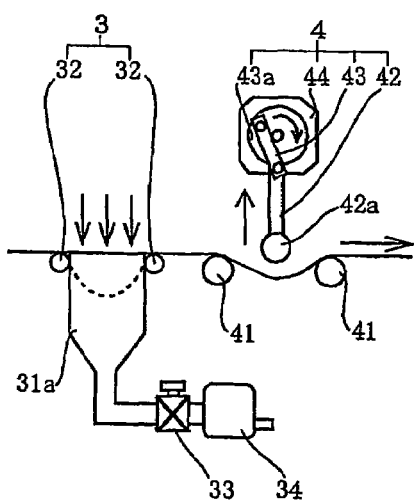

In the present embodiment, the mechanism by which one multi-filament bundle is spread by means of an apparatus example 1 as shown in FIGS. 1 through 3 is explained as follows.

Apparatus Example 1

Reference numeral 11 in FIGS. 1 and 2 indicates a yarn supplier of bobbin type around which a long multi-filament bundle Tm is wound, which supplier is supported into a bobbin shaft 12a engaged to a power shaft of a yarn supply motor 12 and from which supplier the bundle Tm is unwound by the rotation of the motor 12. The multi-filament bundle that the present embodiment encompasses includes such reinforced fibers bundles whose component monofilaments are of higher strength as a carbon fibers bundle, a glass fibers bundle, an aramid fibers bundle and a ceramic fibers bundle and such thermoplastic resin fibers bundles as monofilaments made from polyethylene, polypropylene, nylon 6, nylon 66, nylon 12, polyethylene terephtalate, polyphenylene sulfide, polyether ether ketone being bundled. It should be noted that either a non-stranded multi-filament bundle or a preliminarily untwisted multi-filament bundle is put to use for the purpose of saving production cost, since a stranded multi-filament bundle can not be spread continuously without untwisting the same.

Then, reference numeral 2 in the drawings indicates a multi-filament bundle feeder, which feeder comprises a rotatable guide roller 21 to support a multi-filament bundle Tm unwound from the yarn supplier 11 in a fixed position; a pair of anterior and posterior revolving support rollers 22 and 22 to support the bundle Tm at a downstream side from the guide roller 21; a tension stabilizing roller 24a rotatably disposed between the support roller 22 at a upstream side and the guide roller 21 to abut the bundle Tm in passage and to ascend and descend according to change of tensile force applied to the bundle Tm so as to keep a tension of the bundle Tm constant; an upper limit position sensor 25a to detect the upper limit position of the tension stabilizing roller 24a and a lower limit position sensor 25b to detect the lower limit position thereof; a nip roller 23a to press against the support roller 22 at a downstream side and to roll with the bundle Tm sandwiched between itself and the roller 22; and a uni-directionally rotatable clutch 23b to rotate the nip roller 23a only to a feeding direction of the bundle Tm so as to prevent the bundle Tm from being drawn back to a reverse direction to the feeding course thereof.

The stabilization of the tensile force applied to the bundle Tm that is drawn out from the yarn supplier 11 of the apparatus example 1 is realized as follows. Namely, the tension stabilizing roller 24a of the multi-filament bundle feeder moves upwards when the tension of the bundle Tm in passage is increased while moving downwards when the same is decreased. Then, when the tension stabilizing roller 24a reaches at the upper limit position thereof, the upper limit position sensor 25a detects such position and a signal to that effect is input to the yarn supply motor 12 to increase the revolving speed of the yarn supplier 11 so as to increase feeding the bundle Tm while to descend the tension stabilizing roller 24a. On the other hand, when the tension stabilizing roller 24a reaches at the lower limit position thereof, the lower limit position sensor 25b detects such position and a signal to that effect is input to the yarn supply motor 12 to decrease the revolving speed of the yarn supplier 11 so as to decrease feeding the bundle Tm. In this way, the tensile force applied to the bundle Tm by use of the apparatus example 1 is always kept constant.

The bundle Tm provided with a certain initial tension as mentioned above proceeds to run between the support roller 22 and the nip roller 23a. In this regard, the nip roller 23a is provided with a uni-directionally rotatable clutch 23b so that the nip roller 23a does not rotate to a reverse direction to the feeding direction of the bundle and there is no effect on the upstream side from the nip roller 23a even if the bundle is subjected to reciprocal tension and relaxation by a tensile force variable system disposed at a downstream side as mentioned below, thereby, the bundle Tm being unwound along the feeding course thereof with a constant tension.

Then, reference numeral 3 in the drawings indicates a fluid flowing spreader of cavity tube type. A suction cavity tube, the aperture of which tube acts as a fluid flowing portion 31a, is adopted herein for the fluid flowing spreader. This fluid flowing portion 31a is disposed in the same elevation level as the feeding course of the bundle Tm, on an entrance side and an exit side respectively of which portion 31a a guide roller 32 is disposed to keep the bundle Tm in passage at a certain elevation level. The fluid flowing portion 31a acting as a suction cavity tube is provided with a suction air pump 34, and the operation of the suction air pump 34 with a flow rate adjustment valve 33 regulated as necessary causes suction air stream with a flow rate as required inside the fluid flowing portion 31a.

Then, reference numeral 4 in the drawings indicates a tensile force variable system, which system is disposed between a pair of anterior and posterior support rollers 41 and 41 horizontally disposed with an interval therebetween at a downstream side from the fluid flowing spreader 3. This tensile force variable system 4 of the apparatus example example 1 comprises an elevating rod 42 provided with a press roller 42*a* at a lower end portion thereof; an extensile and contractile crank arm 43 engaged to the elevating rod 42; and a crank motor 44 whose power shaft is provided with a rotor 43*a* in engagement to the crank arm 43. According to the ascend and descend of the elevating rod 42 caused through the crank arm 43 by driving the crank motor 44 so as to rotate the rotor 43*a*, the press roller 42*a* repeats to perform a push-down, and detachment operation with regard to the bundle Tm in the process of being spread so that the tensile force applied to the bundle Tm changes alternatively between tension and relaxation. This tensile force variable system 4 is disposed between a pair of support rollers 41 and 41 that support the bundle in the process of being spread at a certain elevation level. To note, the change of the revolving speed of the crank motor 44 allows the reciprocal cycle of tension and relaxation performed on the bundle Tm to be regulated.

While the bundle Tm is in the middle of passing through the fluid flowing portion 31*a* in suspension after having passed a section where the bundle Tm is sandwiched between the support roller 22 and the nip roller 23*a*, the bundle Tm is reciprocally subjected to the sudden change of the tensile force applied thereto between tension and relaxation by the press roller 42*a* of the tensile force variable system 4 provided at a downstream side, which change affects the section where the bundle Tm is sandwiched between the support roller 22 and the nip roller 23*a*. Thus, upon the bundle Tm affected by such reciprocal tension and relaxation as mentioned above being subjected to suction air stream, when the tensile force applied to the bundle Tm changes from tension to relaxation as shown by the arrow (a) to (b) in FIG. 3, the bundle Tm bends towards the direction to which the air stream flows so that the length of the respective monofilaments existing inside the fluid flowing portion 31*a* momentarily becomes larger so as to facilitate the bundle being spread widthwise. That is to say, the relaxation of the bundle slackens the tension between adjacent monofilaments so as to increase the volume of air stream to flow through such adjacent monofilaments, which results in the spreading operation being intensified. On the contrary, when the tensile force applied to the bundle changes from relaxation to tension as shown by the arrow (b) to (a) in FIG. 3, the degree to which the bundle Tm bends inside the fluid flowing portion 31*a* reduces, and the respective component monofilaments are aligned in a straight manner as if they are combed by the suction air stream with the spread bundle maintained as it is.

The spread multi-filament bundle Ts in this way is taken up by a take-up mechanism 5, which mechanism comprises a pair of take-up rollers 51 and 51 and a take-up motor 52. To follow up the above explanation, the moving speed of the bundle is determined by the revolving speed of the motor 52, which moving speed is adjustable by controlling the motor 52 with a speed setter not shown in the drawings. Further, a wind-up beam not shown in the drawings is disposed at a downstream side from the take-up mechanism 5 to wind up the spread multi-filament bundle Ts, and a pre-impregnation device not shown in the drawings may be provided in series to perform an impregnation of the variety of resins on the spread multi-filament bundle Ts, if required.

Second Embodiment

In the present embodiment, the mechanism by which a number of spread multi-filament bundles are produced by use of an apparatus example 2 as shown in FIGS. 4 and 5.

Apparatus Example 2

Reference numeral 1 in the drawings indicates a creel in which a number of yarn suppliers 11 of bobbin type (five yarn suppliers being illustrated herein) around which a long multi-filament bundle Tm is wound in a number of layers are disposed in multi-stages. In the same way as the apparatus example 1, a yarn supply motor 12 is provided with the respective yarn suppliers 11 of the apparatus example 2, the rotation of which motor allows the bundle Tm to be unwound from the respective suppliers 11.

A number of the multi-filament bundles Tm are drawn out from the yarn suppliers 11•11 . . . of the creel 1, the respective bundles Tm•Tm . . . as drawn out being taken up by a multi-filament bundle feeder 2 disposed corresponding to each of those bundles. The basic structure of the portions of the respective multi-filament bundle feeders 2 of the apparatus example 2 corresponding to the respective yarn suppliers 11 is the same as that of the apparatus example 1, which bundle feeder comprises a rotatable guide roller 21 to support a multi-filament bundle Tm unwound and fed from the yarn supplier 11 in a fixed position; a pair of anterior and posterior support rollers 22 and 22 rotatably disposed at a downstream side from the guide roller 21 to support the multi-filament bundles Tm; a tension stabilizing roller 24*a* rotatably disposed between the support roller 22 at an upstream side and the guide roller 21 to abut the multi-filament bundle Tm in passage and to ascend and descend according to change of tensile force applied to the bundle Tm so as to keep the tension of the bundle Tm constant; a upper limit position sensor 25*a* to detect the upper limit position of the tension stabilizing roller 24*a* and a lower limit position sensor 25*b* to detect the lower limit position thereof; a nip roller 23*a* to press against the support roller 22 at a downstream side and to roll with the bundle Tm sandwiched between itself and the support roller 22 at a downstream side; and a uni-directionally revolving clutch 23*b* to rotate the nip roller only to a feeding direction of the bundle Tm so as to prevent the bundle from being drawn back. To note, a pair of upper and lower alignment guide rollers 26 and 26 are provided with the apparatus example 2 in addition to the above structural elements, because the respective multi-filament bundles Tm as unwound need to be aligned in parallel in the same elevation level so as to put a group of the respective bundles in order, in view of the fact that the yarn suppliers 11•11 . . . are laid in multi-stages in case of the apparatus example 2. Those guide rollers 26 and 26 are intended for sandwiching therebetween a number of multi-filament bundles Tm unwound from the yarn suppliers 11 in multi-stages in the same elevation level so as to control the respective bundles such that they are arranged into an orderly aligned group of the bundles Tm•Tm . . . in parallel with each other and in the same elevation level. The provision of those guide rollers 26 and 26 prevents the fluctuation of the tension to which the respective bundles are subjected at a tensile force variable system as described below from affecting an upstream side from those rollers.

When the tension applied to any one of the bundles Tm•Tm . . . taken up by the multi-filament bundle feeder 2 and passing the tension stabilizing roller 24*a* increases, the tension stabilizing roller 24*a* goes upwards while going downwards when the same decrease in the same way as the apparatus example 1. When the tension stabilizing roller 24a reaches at an upper limit position thereof, the upper limit position sensor 25a detects such position and a signal to that effect is input to the yarn supply motor 12 to increase the revolution of the yarn supplier so as to augment the amount by which the bundle T is unwound. On the contrary, when the tension stabilizing roller 24a reaches at a lower limit position thereof, the lower limit position sensor 25b detects such position and a signal to that effect is input to the yarn supply motor 12 to decrease the revolution of the yarn supplier 11 so as to reduce the amount by which the bundle Tm is unwound. Then, the respective bundles Tm•Tm . . . are guided into the alignment guide rollers 26 and 26 with the tension thereof kept constant by the self-control action of the multi-filament bundle feeder 2 so as to be aligned in parallel with each other and in the same elevation level.

Then, the respective multi-filament bundles Tm•Tm . . . that have passed through the alignment guide rollers 26 and 26 move from a fluid flowing spreader 3 via a tensile force variable system 4 to a take-up roller 5. The arrangement of the multi-filament bundle feeder 2, the fluid flowing spreader 3, the tensile force variable system 4 and the take-up system 5 respectively comprising the apparatus example 2 is substantially the same as that of the apparatus example 1, but the apparatus example 2 is provided with some design modifications in view of a number of bundles Tm (five bundles herein) being subjected to spreading operation. Thus, such modifications are supplemented as follows. To note, the explanation of the multi-filament bundle feeder 2 is omitted to avoid-redundancy.

Firstly, the fluid flowing spreader 3 of the apparatus example 2 adopts the same cavity tube type as the apparatus example 1, but the difference between them lies in as follows. That is to say, the fluid flowing spreader 3 of the apparatus example 2 is provided with three fluid flowing portions 31a, 31b and 31c, the opening width of which is enlarged, in this order from a downstream side to an upstream side, in view of the necessity that suction air stream is acted on the respective bundles Tm•Tm . . . as a whole. The opening of the respective fluid flowing portions 31a, 31b and 31c is disposed in the same elevation level as the feeding course of the respective bundles, on an entrance side and an exit side respectively of which opening a guide roller 32 is provided to support the respective bundles Tm in passage at a certain elevation level. Suction air stream is generated inside the respective fluid flowing portions 31a, 31b and 31c by driving a suction pump 34, which pump is provided with a flow rate adjustment valve, 33 so that the flow velocity of the suction air stream inside the respective fluid flowing portions is controlled by the flow rate adjustment valve 33 regulated as necessary.

Then, the tensile force variable system 4 of the apparatus example 2 is the same as that of the apparatus example 1 in that it comprises an elevating rod 42 provided with a press roller 42a at a lower end portion thereof; a contractile and extensile crank arm 43 engaged to the elevating rod 42; and a crank motor 44 whose power shaft is provided with a rotor 43a in engagement to the crank arm 43 and that the system 4 is provided between the upstream and downstream support rollers 41 and 41 with an interval. However, the elevating rod 42 of the tensile force variable system 4 hereof is provided with a press roller 42a at a lower end portion thereof wide enough to press against the respective bundles Tm•Tm . . . moving in parallel with each other.

Upon the rotation of the rotor 43a by driving the crank motor 44, the elevating rod 42 moves up and down through the crank arm 43 so that the press roller 42a performs a push-down and detachment operation with regard to the respective bundles Tm•Tm . . . in the process of being spread so as to change the tensile force applied to the respective bundles alternatively between tension and relaxation at a certain timing, the fluctuation of which tensile force applied thereto affects up to the alignment guide rollers 26 and 26 disposed at an upstream side and is set off there. The respective bundles Tm•Tm . . . passing through the fluid flowing portions 31a, 31b and 31c are subjected to the change of the tensile force applied thereto between tension and relaxation by the action of the press roller 42a. Upon the respective bundles under such fluctuation being subjected to suction air stream, the tension between adjacent monofilaments of the respective bundles is relaxed to increase the volume by which the suction air stream flows through such adjacent monofilaments so as to intensify the spreading operation thereon when the tensile force applied to the respective bundles is in a mode of relaxation. On the other hand, when the tensile force applied thereto changes from relaxation to tension, the respective bundles are aligned in a straight manner as if they are combed by the suction air stream with the spread bundles maintained as they are. Those favorable actions are already noted in the apparatus example 1.

Then, the respective spread multi-filament bundles Ts•Ts . . . whose width is enlarged at the fluid flowing-spreader 3 and that are subjected to the change of the tensile force applied thereto at a certain timing between tension and relaxation are taken up by the take-up system 5. The system 5 of the apparatus example 2 comprises a pair of upper and lower take-up rollers 51 and 51 and a motor 52 to drive those rollers. However, those rollers wide enough to simultaneously wind up a number of the spread multi-filament bundles Ts are adopted herein.

Third Embodiment

In the present embodiment, the same apparatus as the apparatus example 2 is used for producing a spread multi-filaments sheet. The process in which a number of multi-filament bundles Tm•Tm . . . are spread widthwise so as to be formed into one piece of a spread multi-filament bundles sheet Tw is shown in FIG. 6.

The explanation on the apparatus used for producing a spread multi-filaments sheet in the present embodiment is omitted, as the structural arrangement thereof is the same as that of the apparatus example 2. In this embodiment too, spreading operation is performed on a number of multi-filament bundles Tm•Tm . . . in the same way as the second embodiment. The difference between the present embodiment and the second one lies in as follows.

Namely, the present embodiment is methodically characterized in predetermining a maximum width to be spread for the respective multi-filament bundles Tm and feeding the respective bundles Tm from the respective yarn suppliers 11 with each of them disposed side by side with an interval corresponding to such maximum width and moving them to the tensile force variable system 4 via the multi-filaments feeder 2 and the fluid flowing spreader 3, in which the respective bundles are synergistically subjected to suction air stream at the fluid flowing spreader 3 and to the change of the tensile force applied thereto between tension and relaxation at the tensile force variable system 4 so as to be gradually spread, and in integrating the spread bundles into a spread multi-filament bundles sheet Tw with the fringe side monofilaments of any adjacent spread bundles tangentially lined side by side.

The method of producing a spread multi-filament bundles sheet according to the present embodiment may be carried out by use of an apparatus example 3 as shown in FIGS. 7 and 8.

Apparatus Example 3

The difference between the apparatus example 2 and the apparatus according to the present embodiment lies in that the latter is provided with a widthwise back-and-forth friction system 6 between the tensile force variable system 4 and the take-up system 5 to linearly provide a back-and-forth friction widthwise with regard to the respective spread bundles Ts in transit, as if a bow is rubbed against strings for playing a violin. In other words, there is no other difference between the apparatus example 3 and the apparatus example 2 excepting the provision of the friction system 6 hereof.

The back-and-forth friction system 6 of the apparatus example 3 comprises bow bars 61 and 61 that are disposed such that they make a line contact widthwise with regard to the respective spread bundles Ts in transit and a crank mechanism indicated with 62 and 63 to make those bow bars move back-and-forth widthwise with regard to the respective spread bundles Ts and a crank motor 64 to give a driving force to the crank mechanism. A circular pipe made from stainless steel with roughening finish on the surface so as to enhance friction is adopted for any one of those bow bars.

The respective spread bundles Ts in transit after having passed though the tensile force variable system 4 meet with those bow bars 61 and 61 reciprocally moving back-and-forth while they pass through the friction system 6 so as to be subjected to back-and-forth friction widthwise thereto, in which the respective monofilaments comprising the spread bundles Ts respectively are rubbed one by one and even a portion of the spread bundle where adjacent monofilaments are bonded together is softly separated so that a high-quality spread multi-filament bundles sheet Tw is formed with the respective spread bundles Ts uniformly distributed therein.

Apparatus Example 4

The method of producing a spread multi-filament bundles sheet according to the third embodiment may be carried out also by use of an apparatus example 4 as shown in FIGS. 9 and 10.

The apparatus example 4 is characterized in the provision of a floating control bridge 35 in the respective fluid flowing portions 31a, 31b and 31c to secure a minimum degree by which the respective bundles Tm•Tm . . . passing through each of those portions are bent, and the other structural arrangement thereof is the same as the apparatus example 3.

With the third embodiment carried out by use of the apparatus example 4, the respective bundles Tm•Tm . . . are subjected to suction air stream with each of those bundles passed under a floating control bridge 35 provided at the respective fluid flowing portions 31a, 31b and 31c. Thus, even if the tension force applied to the respective bundles Tm passing through those portions is intensified by the action of the tensile force variable system 4 and the like, the respective bundles Tm are abutted onto the floating control bridges 35 so as to be prevented from being straightened or a degree by which the respective bundles Tm are bent from being smaller than secured by the floating control bridges 35. Thus, the minimum contact area between the suction air stream and the respective bundles Tm is secured so that the spreading operation performed thereon at the fluid flowing spreader 3 is stabilized.

Apparatus Example 5

Then, the method of producing a spread multi-filament bundles sheet according to the third embodiment may be carried out also by use of an apparatus example 5 as shown in FIG. 11.

The difference between the apparatus example 4 and the apparatus example 5 lies in that the latter is provided with a heater 7 such as a hot fan heater over the respective fluid flowing portions 31a, 31b and 31c so as to blow hot air towards the respective bundles Tm passing through those portions, and the other structural arrangement thereof is the same as the former.

The apparatus example 5 is particularly effective when the monofilaments comprising the respective bundles Tm to be spread are bonded together with a synthetic resin based sizing agent. Hot air blown from a hot fan heater adopted for the heater 7 in the apparatus example 5 softens the sizing agent to bond the monofilaments comprising the respective bundles Tm so as to relax the bonding between adjacent monofilaments, which further promotes the spreading operation performed in those fluid flowing portions 31a, 31b and 31c. The temperature of hot air depends on the type of a sizing agent in use, but in case of an epoxy based sizing agent, such sizing material can be sufficiently softened by hot air ranging from 80 to 150 degrees Centigrade. To note, a far-infrared radiation heater, a high-frequency radiation heater may be adoptable for the heater 7.

Apparatus Example 6

The method of producing a spread multi-filament bundles sheet according to the third embodiment may be carried out also by use of an apparatus example 6 as shown in FIG. 12.

The difference between the apparatus example 5 and the apparatus example 6 lies in that the latter is provided with a fluid flowing spreader 3 of suction cavity tube type whose opening is prolonged to a feeding direction of the respective bundles Tm, which opening is equally segmented into fluid flowing portions 31a, 31b and 31c in this order from an upstream side to a downstream side, and the other structural arrangement thereof is the same as the former. The apparatus example 6 requires only one flow rate valve 33 and a single suction air pump 34 for the fluid flowing spreader 3 so that the manufacturing cost of an apparatus can be reduced and the operation thereof is simplified.

Fourth Embodiment

In the present embodiment, substantially the same apparatus as the apparatus example 5 as described above in which hot air is blown towards the respective fluid flowing portions 31a, 31b and 31c by a heater 7 such as a hot fan heater provided over those portions is arranged in complexity so as to produce either spread multi-filament bundles or spread multi-filament bundles sheets, which bundles or sheets are overlapped one over another to produce a complex spread multi-filament bundles sheet. The production process of a commingled spread multi-filament bundles sheet is shown in FIGS. 13 through 15.

Apparatus Example 7

An apparatus example 7 is shown in FIG. 13, which apparatus is used for the present embodiment. This apparatus example 7 has an upper and lower arrangement, either of which arrangement is provided with a creel 1, a multi-filament bundle uni-directional feeder 2, a fluid flowing spreader 3, a heater 7 and a guide roller 8, and further comprises a pair of influx rollers 9, a tensile force variable system 4, a widthwise back-and-forth friction system 6 provided with bow bars 61 and 61 and a take-up system 5.

This apparatus example 7 is arranged such that a number of multi-filament bundles Tm•Tm . . . (five bundles herein) are unwound from the respective upper and lower creels 1 and are moved to the respective fluid flowing spreaders 3 with a certain tensile force applied to each of those bundles by the respective uni-directional multi-filament bundles feeders 2 while with each of those bundles being prevented from being drawn back by means of a nip roller and a uni-directionally rotatable clutch. Then, the multi-filament bundles Tm•Tm . . . are subjected at the respective fluid flowing spreaders 3 to the reciprocal change of the tensile force applied thereto between tension and relaxation caused by the respective tensile force variable systems 4 at a downstream side, under which change of the tensile force applied thereto each of those bundles is subjected to suction air stream so as to be spread. Thereafter, the respective bundles Tm are formed into spread multi-filament bundles or a spread multi-filament bundles sheet, and such bundles or sheet moves towards the influx rollers 9 through the respective guide rollers 8, at which influx roller 9 the respective upper and lower spread multi-filament bundles or the respective upper and lower spread multi-filament bundles sheets are overlapped one over another so as to be stacked together and then to be moved to the widthwise back-and-forth friction system 6 provided with the bow bars 61 and 61 via the tensile force variable system 4. Then, the spread multi-filament bundles or the spread multi-filament bundles sheets as stacked are subjected to the fluctuation of the tensile force applied to the respective bundles or sheet as stacked between tension and relaxation by the tensile force variable system 4, under which fluctuation the spread multi-filament bundles or the spread multi-filament bundles sheets as stacked are subjected to back-and-forth friction by the bow bars 61 and 61 of the widthwise back-and-forth friction system 6 moving widthwise with regard to the bundles or the sheet as stacked. Hereupon, the respective monofilaments comprising the upper spread multi-filament bundles respectively or the upper spread multi-filament bundles sheet are uniformly commingled with those comprising the lower spread multi-filament bundles respectively or the lower spread multi-filament bundles sheet so as to be formed into a complex spread multi-filament bundles sheet good at miscibility and uniform in thickness, which complex sheet is taken up by the take-up system 5 so as to be wound into a wind-up beam not shown in the drawings.

FIG. 14 comprises illustrations to show the process in which the spread multi-filament bundles as stacked with the upper spread multi-filament bundles overlapped with the lower spread multi-filament bundles are formed into a complex spread multi-filament bundles sheet. FIG. 15 comprises illustrations to show the process in which the spread multi-filament bundles sheets as stacked with the upper spread multi-filament bundles sheet overlapped with the lower spread multi-filament bundles sheet are formed into a commingled spread multi-filament bundles sheet.

In the present embodiment as shown in FIGS. 13 through 15, it is shown that the spread multi-filament bundles obtained in the upper and lower stages respectively are overlapped one over another and intermingled so as to be formed into a complex spread multi-filament bundles sheet, but such multi-stages arrangement as comprising more than three stages may be adoptable.

Further, the spread multi-filament bundles as stacked to be intermingled so as to be formed into a complex spread multi-filament bundles sheet are not limited to the same type of materials, but may be of different types. For examples, not only the combination of the same types such as spread carbon fibers bundles overlapped over the same bundles, spread polypropylene resin fibers bundles stacked with the same bundles, but also the combination of different types such as spread carbon fibers bundles overlapped over spread glass fibers bundles, spread carbon fibers bundles stacked with spread aramide resin fibers bundles or the combination of reinforced fibers bundles and thermoplastic resin fibers bundles such as spread carbon fibers bundles overlapped with spread polypropylene resin fibers bundles, spread glass fibers bundles stacked with spread nylon 6 resin fibers bundles are available.

Hereafter, the practical aspect of the invention is examined by showing the following test examples on the basis of the first through fourth embodiments.

Test Example 1

In order to examine the workability of the first embodiment, the spreading operation is performed on a carbon fiber bundle by use of an apparatus arranged such that a hot fan heater used as a heater is further provided over the fluid flowing spreader 3 of the apparatus example 1 as shown in FIG. 1.

In this test example, a carbon fibers bundle 12K marketed under the trade name of 'PYROFIL TR 50S' produced by Mitsubishi Rayon Co., Ltd., in which 12,000 carbon monofilaments respectively of 7 μm in diameter are bundled, is adopted for a test sample. Herein, the initial tensile force of 40 g is applied to the carbon fibers bundle Tm by the tension stabilizing roller 24a, which bundle is fed to the fluid flowing spreader 3 of suction cavity type. The apparatus adopted herein is arranged as follows.

(1) The dimension of the opening over the fluid flowing portion 31a being 40 mm in width and 30 mm in length along a feeding course of the bundle and the flow velocity of the suction air stream being set at 20 m/second in an empty condition.

(2) On an entrance side and an exit side of the fluid flowing portion 31a, a guide roller 32 having 10 mm in diameter and made from stainless steel, the surface of which roller is satin finished, being disposed.

(3) The heater (hot fan heater) directed towards the fluid flowing portion 31a being capable of continuously blowing hot air of 120 degrees Centigrade thereto.

(4) The crank motor 44 of the tensile force variable system 4 being designed at 350 rpm and the pushdown stroke by the rod 42 to the bundle being set at 20 mm.

(5) The take-up speed of the bundle by the take-up system 5 being set at 10 m/minute.

In this test example, the carbon fibers bundle 12 K whose initial width is 5 mm and whose initial thickness is 0.15 mm before being subjected to the spreading operation is formed into a spread fibers bundle Ts whose width is 20 mm and whose thickness is 0.04 mm. Commercially speaking, it is confirmed that this spread fibers bundle Ts is stable in spread width, the alignment and distribution of which monofilaments are good.

Test Example 2

Five carbon fibers bundles are simultaneously spread by use of the apparatus example 2 as shown in FIG. 4 with a heater 7 (hot fan heater) provided over the fluid flowing spreader 3 thereof and a floating control bridge 35 internally provided at the depth of 10 cm of the respective fluid flowing portions 31a, 31b and 31c so as to be formed into five spread fibers bundles. Herein, a carbon fibers bundle 6K marketed under the trade name of TORAYCA M55J manufactured by Toray Co., Ltd., in which 6000 carbon fibers having a higher elastic modulus of 540 GPa respectively are bundled, is adopted for the carbon fibers bundle. The elastic modulus of a generally used carbon fiber amounts to about 240 Gpa.

In this test example, five yarn suppliers 11 are disposed such that five fibers bundles Tm•Tm . . . are lined widthwise with an interval of 10 mm between them and it is adjusted by the tension stabilizing roller 24a such that the tensile force applied to the respective bundles Tm becomes 25 g. Those bundles are then fed to the fluid flowing spreader 3 provided with the fluid flowing portions 31a, 31b and 31c of suction cavity tube type in this order. The apparatus used herein is arranged as follows.

(1) The dimension of the opening of the respective fluid flowing portions 31a, 31b and 31c being 50 mm in width and 30 mm in length along the feeding course of the respective bundles and the flow velocity of the suction air stream being set at 20 m/second in an empty condition.
(2) On an entrance side and an exit side of the respective fluid flowing portions, a guide roller 32 having 10 mm in diameter and made from stainless steel whose surface is satin finished being provided.
(3) A heater (hot fan heater) directed towards the respective fluid flowing portions being capable of continuously blowing hot air of 120 degrees Centigrade thereto.
(4) The crank motor 44 of the tensile force variable system 4 being designed at 350 rpm and the push-down stroke by the rod 42 to the respective bundles being set at 20 mm.
(5) The take-up speed of the respective bundles by the take-up system 5 being set at 10 m/minute.

In this test example, the carbon fibers bundle 6K whose initial width is 1 mm and whose initial thickness is 0.2 mm before being subjected to the spreading operation is formed into five spread carbon fibers bundles Ts respectively. It is confirmed that there is almost no cut on the monofilaments in spite of the fact that a carbon fiber of higher elastic modulus is in use and the monofilaments of the respective spread bundle are aligned and distributed orderly and uniformly.

Test Example 3

In this test example, 16 carbon fibers bundles are simultaneously spread and consolidated into a spread multi-filament bundles sheet by use of the apparatus example 5 as shown in FIG. 11. A carbon fibers bundle 12K marketed under the trade name of 'PYROFIL TR 50S' manufactured by Mitsubishi Rayon Co., Ltd., in which 12,000 monofilaments respectively having 7 μm in diameter are bundled, is adopted for the test sample.

Herein, 16 yarn supply bobbins are disposed such that 16 fibers bundles Tm are lined widthwise with an interval of 20 mm between them and it is adjusted by the tension stabilizing roller 24a such that the tensile force applied to the respective bundles becomes 40 g. Then, those bundles are fed to the fluid flowing spreader 3 provided with the fluid flowing portions 31a, 31b and 31c of suction cavity tube type. The opening of the respective fluid flowing portions has 320 mm in width and 30 mm in length along the feeding course of the bundles and the flow velocity of the suction air stream is set at 25 m/second in an empty condition. The respective fluid flowing portions are provided with a floating control bridge 35 having 10 mm in diameter at the depth of 10 mm from a moving course of the respective bundles. A circular rod made from stainless steel whose 'surface ' is satin finished is adopted for the floating control bridge. Then, hot air of 120 degrees Centigrade is blown to the respective bundles Tm in the process of being spread from the heater 7 (hot fan heater) disposed opposite to the respective fluid flowing portions. The crank motor 44 of the tensile force variable system 4 revolves at 350 rpm and the push-down stroke to the respective bundles by the rod 42 is set at 20 mm. Further, the widthwise back-and-forth friction system 6 is provided with two bow bars respectively made from a stainless steel circular rod whose surface is satin finished, the crank motor 65 of which system 6 revolves at 200 rpm and the back-and-forth stroke of which bow bars respectively is set at 4 mm so as to apply a back-and-forth friction widthwise with regard to a spread multi-filament bundles sheet. In this example, the take-up speed of the respective bundles by the take-up system 5 is set at 10 m/minute.

As a result of the above test, each of the carbon fibers bundles 12K whose initial width is 5 mm and whose initial thickness is 0.15 mm before being subjected to the spreading operation is processed into a spread fibers bundle having 20 mm in width. Those spread bundles Ts are consolidated into a spread multi-filament bundles sheet Tw having 320 mm in width and 0.04 mm in thickness wherein the fringe side monofilaments of any adjacent spread bundles Ts are tangentially aligned in an orderly manner and the monofilaments as a whole are distributed-uniformly in density.

Test Example 4

Herein, 16 carbon fibers bundles are simultaneously spread and consolidated into a spread multi-filament bundles sheet by use of the apparatus example 6 as shown in FIG. 12. A carbon fibers bundle 12K marketed under the trade name of 'PYRONFIL TR 50S' manufactured by Mitsubishi Rayon Co., Ltd., in which 12,000 monofilaments respectively having 7 min diameter are bundled, is adopted for the test sample.

Herein, 16 yarn supply bobbins are disposed such that 16 carbon fibers bundles Tm are lined widthwise with an interval of 20 mm between them and it is adjusted by the tension stabilizing roller 24a such that the tensile force of 40 g is applied to the respective bundles Tm. Those bundles are fed to the fluid flowing spreader 3 provided with the fluid flowing portions 31a, 31b and 31c which are formed by segmenting a lengthwise opening of the suction cavity tube running along the moving course of the bundles with a certain interval between them. The fluid flowing spreader 3 has 320 mm in width whose segmented fluid flowing portions respectively have 30 mm in length along the moving course of the respective bundles. A guide roller 32 is made from stainless steel circular rod having 1.0 mm in diameter whose surface is satin finished. A suction air pump 34 operates by regulating the flow rate adjustment valve 33 such that the flow velocity of the suction air stream in the fluid flowing spreader 3 is set at 25 m/second in an empty condition. Further, the respective fluid flowing portions as segmented are provided with a floating control bridge 35 having 10 mm in diameter at the depth of 10 mm from the moving course of the bundles. Then, hot air of 120 degrees Centigrade is continuously blown to the respective bundles in the process of being spread from the heater 7 (hot fan heater) provided over the fluid flowing spreader 3. The crankmotor 44 of the tensile force variable system 4 revolves at 350 rpm and the pushdown stroke by the rod 42 to the respective bundles is set at 20 mm. On the other hand, the crank motor 65 of the widthwise back-and-forth friction system 6 revolves at 200 rpm and the back-and-forth stroke of the bow bars thereof 61 and 61 respectively is set at 4 mm, thereby, the surface of a spread multi-filament bundles sheet Tw in passage being subjected to reciprocally back-and-forth friction widthwise thereto. The spread multi-filament bundles sheet Tw is taken up by the take-up system 5 at 10 m/minute.

As result of the above test, the respective carbon fibers bundles 12K whose initial width is 5 mm and whose initial thickness is 0.15 mm before being subjected to the spreading operation are processed into the respective spread fibers bundles Ts having 20 mm in width. Those spread bundles Ts are consolidated into a spread multi-filament bundles sheet Tw having 320 mm in width and 0.04 mm in thickness wherein the fringe side monofilaments of any adjacent spread bundles are tangentially aligned in an orderly manner and the monofilaments as a whole are distributed uniformly in density.

Test Example 5

Herein, 16 carbon fibers bundles are simultaneously spread and consolidated into a spread multi-filament bundles sheet by use of the apparatus example 7 as shown in FIG. 13. A carbon fibers bundle 12K marketed under the trade name of 'PYROFIL TR 50S' manufactured by Mitsubishi Rayon Co., Ltd., in which 12,000 monofilaments respectively having 7 μm in diameter are bundled, is adopted for the test sample.

Eight yarn supply bobbins 11 are disposed on an upper creel 1 and as many yarn supply bobbins are disposed on a lower creel 1 such that the respective fibers bundles Tm fed from the upper and lower creels 1 and 1 respectively are lined widthwise with an interval of 40 mm between them. To note, the respective-fibers bundles Tm as proceeding in a moving course thereof are arranged such that any adjacent bundles are spaced apart by 20 mm. Then, the tensile force of 40 g is applied to the respective bundles Tm by the respective tension stabilizing rollers 24a and are fed to the respective fluid flowing spreaders 3 provided with the fluid flowing portions 31a, 31b and 31c of suction cavity tube type. The opening of the respective fluid flowing portions has 320 mm in width and 40 mm in length, in which the suction air stream is generated at the flow velocity of 25 m/second in an empty condition. The respective fluid flowing portions are provided with a floating control bridge 35 having 10 mm in diameter at the depth of 10 mm from the upper edge thereof along the moving course of the bundles. Hot air of 120 degrees Centigrade is continuously blown to the respective bundles from the heater 7 (hot fan heater) oppositely provided over the fluid flowing spreader 3. The crank motor 44 of the tensile force variable system 4 revolves at 200 rpm and the pushdown stroke by the press roller 42a to the respective bundles is set at 20 mm. In turn, the back-and-forth stroke by the bow bars 61 and 61 respectively of the widthwise back-and-forth friction system 6 is set at 4 mm, thereby, the spread multi-filament bundles sheet Tw in passage being subjected to reciprocally back-and-forth friction widthwise thereto. The spread multi-filament bundles sheet Tw is taken up by the take-up system 5 at 10 m/minute.

As a result of the above test, the respective carbon fibers bundles 12K whose initial width is 5 mm and whose initial thickness is 0.15 mm before being subjected to the spreading operation are processed into the respective spread bundles Ts having 40 mm in width upon passing through the upper and lower fluid flowing spreaders 3. Those spread bundles Ts are fed from the upper and lower fluid flowing spreaders 3 respectively in the form of a spread multi-filaments sheet Tw with the fringe side monofilaments of any adjacent spread bundles Ts and Ts tangentially aligned and then overlapped one over another at the influx rollers 9 via the respective guide rollers 8, which sheets as overlapped are subjected to back-and-forth friction widthwise thereto by the widthwise back-and-forth friction system 6 so as to be formed into a commingled spread multi-filament bundles sheet Tw with the monofilaments thereof as a whole distributed and intermingled with each other uniformly in density, which commingled sheet has 320 mm in width and 0.04 mm in thickness.

The test examples on the basis of the first through fourth embodiments are described above, and the other embodiments of the invention are further explained as follows.

Fifth Embodiment

The 'method of producing a spread multi-filament bundle' according to the present embodiment is explained on the basis of an apparatus example 8 as shown in FIGS. 16 and 17.

With reference to FIGS. 16 and 17, a carbon multi-filament bundle Tm having a diameter of 5 mm, in which 12,000 monofilaments respectively having 7 μm in diameter are bundled, marketed under the item number of 'TR 50S' manufactured by Mitsubishi Rayon Co., Ltd., is drawn out from a yarn supply bobbin 11 by the multi-filament bundle feeder 2 and is then fed to the fluid flowing spreader 3 with a velocity of 10 m/minute upon passing through a streak of rollers 21 and 22 (23).

The carbon multi-filament bundle Tm as fed to the fluid flowing spreader 3 moves from an upstream side to a downstream side by passing through the opened suction cavity of the respective fluid flowing portions 31a, 31b, 31c and 31d in which suction air stream with a velocity of 20 m/second is generated. Hereupon, the multi-filament bundle in contact with the suction air stream is bent towards the flowing direction of the suction air so as to increase the contact area between the bundle Tm and the air stream. The enlargement of such contact area permits the air stream to flow through any adjacent monofilaments of the bundle Tm so as to slacken the bonding thereof, which starts spreading the multi-filament bundle. While the bundle Tm moves from the fluid flowing portion 31a at an upstream side via the fluid flowing portion 31b to the portion 31c at a downstream side, the bundle is gradually being spread and is processed into a spread multi-filament bundle Ts having about 25 mm in width upon passing the portion 31d located at the farthest downstream side.

Apparatus Example 8

FIGS. 16 and 17 show an apparatus used for the 'method of producing a spread multi-filament bundle' according to the above fifth embodiment.

Namely, reference numeral 11 in the drawings indicates a yarn supplier of bobbin type, around which bobbin a fibers bundle Tm is wound.

Then, reference numeral 2 therein indicates a multi-filament bundle feeder, which supplier comprises a pair of support rollers 21 and 22 disposed with an interval between them to support a fibers bundles Tm unwound from the yarn supplier 11 in a fixed elevation level; uni-directionally driving rollers 23 and 23 to draw out the bundle Tm from the yarn supplier 11 with the bundle sandwiched between them; a tension stabilizing dumper 24 provided with a rotatable tension stabilizing roller 24a at a lower end portion thereof and disposed between the support rollers 21 and 22, which tension stabilizing roller 24a abuts the bundle Tm unwound from the supplier 11 at a constant pressure so that the roller 24a in abutment with the bundle Tm continues pressing against the bundle Tm so as to increase the degree by which the bundle is bent together with the increment of the tension applied thereto until the tensile force applied thereto becomes a predetermined level when the tensile force applied thereto is smaller than such predetermined level and inferior to the pressure applied by the roller while the roller 24a in abutment with the bundle continues retracting so as to decrease the degree by which the bundle is bent until the tensile force applied thereto becomes a predetermined level when the tensile force applied thereto is larger than such predetermined level and superior to the pressure applied by the roller. The bundle Tm that is unwound from the multi-filament bundle feeder 2 and pass between the uni-directionally driving rollers 23 and 23 is fed to a fluid flowing spreader as described below.

Then, reference numeral 3 therein indicates a fluid flowing spreader of suction cavity tube type, which spreader is provided with the respective fluid flowing portions 31a, 31b, 31c and 31d. Namely, the respective fluid flowing portions are disposed in the same elevation level along the moving course of the fibers bundle Tm, on an entrance side and an exit side of which respective portions, a guide roller 32 to keep the bundle in passage at a certain elevation level is provided. The respective suction cavity tubes are provided with a suction air pump 34, the operation of which pump by regulating the suction air with a flow rate adjustment valve 33 as necessary causes a suction air stream with a velocity as required for the respective portions. The fibers bundle Tm passing through those fluid flowing portions bends towards the flowing direction of the suction air in contact therewith, which suction air flows through adjacent monofilaments thereof so as to be performed spreading operation thereon.

Then, reference numeral 51 therein indicates a take-up roller to take up a spread multi-filament bundle Ts after the passage through those fluid flowing portions at the velocity of 10 m/minute, which spread bundle Ts after the passage through the take-up rollers 51 and 51 is wound up around a winding beam B.

Sixth Embodiment

The 'method of producing a spread fibers bundles sheet' according to the present embodiment is explained on the basis of an apparatus example 9 as shown in FIGS. 18 and 19.

The respective carbon multi-filament bundles Tm•Tm•Tm respectively having 5 mm in diameter, in which 12,000 monofilaments respectively having 7 μm in diameter, marketed under the item number of 'TR 50S' manufactured by Mitsubishi Rayon Co, Ltd., are unwound from the respective bobbins 11•11•11 by the respective multi-filament bundle feeders 2 and at the same velocity fed to the fluid flowing spreader 3 with aligned in parallel in the same plane and spaced apart with an equal interval between them while passing through the uni-directionally driving rollers 23 and 23.

The respective multi-filament bundles Tm•Tm•Tm fed to the fluid flowing spreader 3 move from an upstream side to a downstream side by passing through the opened cavity tube of the respective fluid flowing portions 31a, 31b, 31c and 31d in succession in which the suction air stream with a velocity of 20 m/second is generated. Hereupon, the respective multi-filament bundles Tm in contact with the suction air stream bend towards the flowing direction of the suction air so as to increase the contact area between the respective bundles and the suction air stream. The enlargement of such contact area allows the suction air stream to flow through any adjacent monofilaments of the respective bundles Tm so as to slacken the bonding thereof, which starts spreading the respective bundles. While the respective bundles Tm•Tm•Tm move from the fluid flowing portion 31a at an upstream side via the fluid flowing portion 31b to the portion 31c at a downstream side, they are gradually being spread and processed into a spread multi-filament bundles sheet Tw having about 60 mm in width with the fringe side monofilaments of any adjacent bundles tangentially aligned upon passing the portion 31d at the farthest downstream side.

Apparatus Example 9

FIGS. 18 and 19 show an apparatus example 9 that is used in the 'method of producing a spread fibers bundles sheet' according to the sixth embodiment.

Namely, in the drawings, reference numeral 1 indicates a creel onto which three yarn suppliers 11•11•11 of bobbin type are suspended, around which suppliers respectively a fibers bundle Tm is wound. To note, only three suppliers are shown, the number of which suppliers may be modified into as many suppliers as necessary through pegs arrangement.

Then, reference numeral 2 therein indicates a multi-filament bundle feeder, which bundle feeder comprises uni-directionally driving rollers 23 and 23 to draw out the respective fibers bundles Tm•Tm•Tm from the respective yarn suppliers 11 and to feed those fibers bundles in parallel with aligned in the same plane and at the same speed; support rollers 21 and 22 intervening between the uni-directionally driving rollers 23 and 23 and the respective suppliers 11 and disposed in a multi-stage arrangement (three stages being shown herein) to support the respective fibers bundles Tm•Tm•Tm as unwound in a fixed position; a tension stabilizing dumper 24 of each stages disposed between the support rollers 21 and 22 and provided with a tension stabilizing roller 24a at a lower end portion thereof, which roller 24a abuts the respective fibers bundle Tm of each stages unwound from the respective yarn suppliers 11 under a constant pressure so that the roller 24a in abutment with the respective fibers bundles Tm continues pressing against the latter so as to increase the tension applied thereto until such tension becomes a predetermined level when the tension of the respective fibers bundles is smaller than such predetermined level while the roller 24a in abutment therewith is bounced back by the respective fibers bundles Tm to retract when the tension thereof is larger than such predetermined level so as to keep the tension applied to the respective fibers bundles constant. The respective fibers bundles Tm•Tm•Tm carried forwards by the respective multi-filament bundle feeders 2 are fed with a certain tension applied thereto to a fluid flowing spreader 3 as described below with each of them aligned in parallel in the same plane and spaced apart with an equal interval upon passing through the uni-directionally driving rollers 23 and 23.

Then, reference numeral 3 therein indicates a fluid flowing spreader of suction cavity tube type, which spreader comprises four fluid flowing portions 31a, 31b, 31c and 31d respectively having an opening on the top. Namely, the respective fluid flowing portions are disposed in the same elevation level along the moving course of the respective fibers bundles that are fed in parallel with aligned in the same plane and with the same speed by the uni-directionally driving rollers 23 and 23, on an entrance side and an exit side of which respective portions a guide roller 32 is provided to keep the respective fibers bundles in passage in a certain elevation level. A suction air pump 34 is engaged to the respective suction cavity tubes of the apparatus example 9, the operation of which pump with the suction air regulated with a flow rate adjustment valve 33 as necessary causes suction air stream with a velocity as required for the respective fluid flowing portions 31a, 31b, 31c and 31d. The respective fibers bundles Tm•Tm•Tm passing through those fluid flowing portions bend towards the flowing direction of the suction air stream in contact therewith, which suction air stream flows through any adjacent monofilaments of the respective bundles so as to be performed spreading operation thereon.

Reference numerals 51 and 51 indicate take-up rollers to take up a spread multi-filament bundles sheet Tw passed through the respective fluid flowing portions 31$a$, 31$b$, 31$c$ and 31$d$ at the velocity of 10 m/minute, which sheet passed between those take-up rollers is wound up by a winding beam B.

Apparatus Example 10

FIGS. 20 through 23 show another apparatus example 10 that is used in the 'method of producing a spread multi-filament bundles sheet' according to the sixth embodiment. This apparatus 10 is characterized in that a floating control bridge 35 is provided in the respective fluid flowing portions 31$a$, 31$b$, 31$c$ and 31$d$ of the apparatus example 9 crosswise to the moving course of the respective fibers bundles Tm, and the other structural arrangement thereof is the same as that of the apparatus example 9. In order to perform spreading operation on the respective fibers bundles by means of this apparatus 10, the respective fibers bundles are subjected to suction air stream with each of them passed under the respective bridges 35 so that there is no case where the respective bundles moving through those fluid flowing portions are straightened or the degree by which they are bent becomes smaller than a predetermined minimum levele, which results in improving spreading efficiency with wider contact area with the suction air stream. In addition, the apparatus 10 is modified such that the elevation level of the respective bridges 35 may be arranged vertically movable by means of a well-known cross bar system not shown in the drawings.

Commenting further, when a floating control bridge 35 is provided inside the respective fluid flowing portions 31$a$, 31$b$, 31$c$ and 31$d$ like the apparatus 10, as shown in FIG. 23, the fibers bundle Tm in the process of being spread proceeds along the moving course thereof with only the monofilaments located in the vicinity of each fringe side thereof in contact with the bridge 35 while those located in the central portion thereof suctioned by the suction air stream so as to separate from the bridge. Thus, in case of the fibers bundle Tm being spread by the action of suction air, there is no inconsistency in spread monofilaments length between the central portion and each fringe side portions thereof so as to gain a widely spread multi-filament bundle, the distribution of which monofilaments is better.

Apparatus Example 11

FIG. 24 shows another apparatus example 11 that is used in the 'method of producing a spread multi-filament bundles sheet' according to the sixth embodiment. This apparatus example 11 is characterized in that a tensile force variable system 4 of up-and-down press roller type intervenes between the uni-directionally driving rollers 23 and 23 and a guide roller 32 on the entrance side of the foremost fluid flowing portion 31$a$, and the other structural arrangement thereof is the same as the apparatus example 10. The tensile force variable system 4 hereof is composed of a rod member extending crosswise to the moving course of the fibers bundle Tm, which member is intended for moving up and down and crosswise with regard to the respective fibers bundles Tm•Tm•Tm fed in parallel from the yarn supply creel in the same plane and at the same speed so as to simultaneously change the tensile force applied to the respective fibers bundles Tm in carriage alternatively and repeatedly between tension and relaxation. When the respective fibers bundles Tm moving between the uni-directionally driving rollers 23 and 23 and a guide roller 32 on the entrance side of the foremost fluid flowing portion 31$a$ are subjected to such an intermittent press by the tensile force variable system 4, the bonding between the adjacent monofilaments corresponding to a portion of the respective fibers bundles rubbed and pressed by the tensile force variable system 4 is slackened and the tensile force applied to the respective fibers bundles Tm moving towards the fluid flowing portions 31$a$, 31$b$, 31$c$ and 31$d$ repeatedly changes between tension and relaxation at a certain timing. Such change of the tensile force applied to the respective fibers bundles, the bonding of which adjacent monofilaments is slackened, brings favorable spreading effect thereon when they are subjected to suction air stream at the respective fluid flowing portions 31$a$, 31$b$, 31$c$ and 31$d$. Namely, when the tensile force applied to the respective fibers bundles Tm changes to relaxation, each of them moving through the respective fluid flowing portions bends to a large extent so as to increase the contact area with the suction air stream, resulting in the respective bundles being spread further while such change of the tensile force applied to the respective bundles is leveled out during each of them moving from the foremost fluid flowing portion 31$a$ to the farthest fluid flowing portions 31$d$, in which condition a spread multi-filament bundles sheet Tw is wound up by a wind-up beam B.

Apparatus Example 12

FIGS. 25 through 27 show another apparatus example 12 that is used in the 'method of producing a spread multi-filament bundles sheet' in accordance with the above sixth embodiment. The difference between the apparatus example 9 and this apparatus lies in that the latter is provided with a guide roller 32 disposed on an entrance side and an exit side of the respective fluid flowing portions for the purpose of supporting the respective bundles Tm in a certain elevation level and arranged such that it reciprocally moves back and forth widthwise with regard to the moving course of the respective bundles, and the other structural arrangement thereof is the same as the former. Namely, the respective guide rollers 32 hereof are engaged to a well-known linkage mechanism 32$c$ connected to a crank arm 32$b$ driven by a crank motor 32$a$, and upon the rotation of the crank motor 32$a$, the crank arm 32$b$ converts such rotation into a back-and-forth motion, which motion is transmitted to the linkage 32$c$ so as to make the respective guide rollers 32 simultaneously move back and forth. The respective monofilaments of those bundles moving in linear contact with a multi-filament bundle friction system M hereof are rubbed through the reciprocal back-and-forth movement of the respective guide rollers comprising the system M so that even a portion of the respective bundles where the adjacent monofilaments thereof are firmly bonded together is tenderly separated from each other so as to further enhance the spreading operation by the action of suction air thereon at the respective fluid flowing portions 31$a$, 31$b$, 31$c$ and 31$d$.

Apparatus Example 13

FIG. 28 shows another apparatus example 13 that is used in the 'method of producing a spread multi-filament bundles sheet' according to the above sixth embodiment. The difference between this apparatus and the apparatus example 9 lies in that the former is provided with a heater 7 (hot fan heater) disposed opposite to the respective fluid flowing portions 31$a$, 31b, 31c and 31d, and the other structural arrangement thereof is the same as the latter. This apparatus is effective particularly when the respective monofilaments of the multi-filament bundles Tm respectively are bonded together with a synthetic resin based sizing agent. Upon hot air of 120 degrees Centigrade being blown towards the respective fluid portions, the sizing agent with which the monofilaments of the respective bundles are bonded together is softened so as to further enhance spreading operation by the action of suction air at the respective fluid portions.

Apparatus Example 14

FIG. 29 shows another apparatus 14 that is used in the 'method of producing a spread multi-filament bundles sheet' in accordance with the above sixth embodiment. The difference between this apparatus and the apparatus example 9 lies in that the former is provided with the arrangement such that a prolonged opening of the suction cavity tube with regard to the moving course of the respective bundles is segmented into the respective fluid flowing portions 31a, 31b, 31c and 31d, and the other structural arrangement thereof is the same as the latter. In comparison with the apparatus example 9, only one suction pump 34 and the sole flow rate adjustment valve 33 are required for the apparatus hereof, which results in reducing the manufacturing cost of the apparatus and facilitating the operation thereof.

Apparatus Example 15

FIG. 30 shows an apparatus example 15 that is used in the 'method of producing a spread multi-filament bundles sheet' according to the above sixth embodiment. The difference between the apparatus example 14 and this apparatus lies in that a floating control bridge 35 is provided in the respective fluid flowing portions, and the other structural arrangement thereof is the same as the apparatus example 14. This floating control bridge 35 works in the same way as that of the apparatus example 9.

Apparatus Example 16

FIG. 31 shows another apparatus example 16 that is used in the 'method of producing a spread multi-filament bundles sheet' according to the above sixth embodiment. The difference between this apparatus and the apparatus example 9 lies in that the former is provided with a sealing plate 31s covering an opening of the respective fluid flowing portions so as to provide each of them with an opened area corresponding to the width of the respective bundles Tm in carriage, and the other structural arrangement thereof is the same as the latter. The opening of the respective fluid flowing portions being covered with such sealing plate 31s, energy loss due to wasteful use of suction air is prevented so as to save operation cost.

Seventh Embodiment

The 'method of producing a spread multi-filament bundles sheet' according to the present embodiment is described as follows on the basis of an apparatus example 17 as shown in FIG. 32.

The respective carbon multi-filament bundles Tm having 5 mm in diameter and drawn out from the respective bobbins 11 of the creel 1 by means of the multi-filament bundle feeder 2, in which 12,000 monofilaments respectively having 7 μm in diameter are bundled and marketed by Mitsubishi Rayon Co., Ltd. under the item number of 'TR 50S', are at the same speed fed to the fluid flowing spreader 3 with aligned in parallel in the same plane and with an equal interval between them upon passing through the uni-directionally driving rollers 23 and 23.

During the respective bundles Tm moving from the uni-directionally driving rollers 23 and 23 towards the wind-up beam B, they pass through the respective fluid flowing portions 31a, 31b, 31c and 31d of water-sealed tube type through which hot water of 80 degrees Centigrade circulates at the flow rate of 5 m/second. Hereupon, the respective bundles Tm pass through in suspension the respective fluid flowing portions via the respective watertight yarn passage holes h. The respective bundles Tm in contact with the circulating hot water at that time bend towards the flowing direction thereof so as to gradually increase the contact area between the respective bundles and the circulating hot water. The enlargement of the contact area between them allows the circulating hot water to further flow through the adjacent monofilaments of the respective bundles so as to slacken the bonding of the monofilaments thereof or further enhance spreading operation. Thus, during the respective bundles Tm moving from the foremost fluid flowing portion 31a via 31b to 31c, each of those bundles are gradually being spread, and when they are done with passing over the farthest fluid flowing portion 31d, a widely spread multi-filament bundles sheet Tw having about 75 mm in width with the side fringe adjacent monofilaments of the respective bundles Tm-tangentially aligned side by side is produced.

Apparatus Example 17

FIG. 32 shows an apparatus example 17 that is used in the 'method of producing a spread multi-filament bundles sheet' according to the seventh embodiment. Reference numeral 1 therein indicates a creel, to which three bobbins 11 are suspended, and a multi-filament bundle Tm is wound around each of those bobbins. Reference numeral 2 therein indicates a multi-filament bundle feeder, which feeder comprises uni-directionally driving rollers 23 and 23 to unwind the respective bundles Tm from the respective bobbins 11 and to feed them with aligned in parallel in the same plane; a streak of anterior and posterior support rollers 21 and 22 intervening between the uni-directionally driving rollers 23 and 23 and the respective bobbins 11 to support the respective bundles Tm in a fixed position; and a tension stabilizing dumper 24 disposed between the pair of support rollers 21 and 22 and provided with a tension stabilizing roller 24a at a lower end portion thereof. The arrangement of the creel 1 and the multi-filaments feeder 2 hereof respectively is the same as that of the apparatus example 9.

Then, reference numeral 3 therein indicates a fluid flowing spreader of water circulating system. This system 3 comprises four fluid flowing portions 31a, 31b, 31c and 31d of diametrically enlarged water-sealed tube type respectively provided with a yarn passage hole h on both opposite sides thereof. Namely, those fluid flowing portions respectively are provided with a yarn passage hole h on both opposite sides thereof in the same elevation level along the moving course of the respective bundles, on an entrance side and an exit side of which fluid flowing portions respectively a yarn passage hole h is provided, a rubber guide roller 32 is disposed to keep the respective bundles Tm in passage in a certain elevation level along with preventing water leakage. A liquid circulation pump 34 is connected to the respective fluid flowing portions hereof, and upon the operation of the respective circulation pumps with the flow rate of a circulating liquid regulated with a flow rate adjustment valve 33, the circulation occurs with a flow velocity as required for the respective fluid flowing portions through the respective circulation pipe 3c. The respective bundles Tm passing through the respective yarn passage holes h of the respective fluid flowing portions and meeting with the circulating hot water bend towards the circulation direction thereof, which causes the circulating hot water to flow through any adjacent monofilaments of the respective bundles so as to be performed spreading operation thereon.

On an exit side of the farthest fluid flowing portion 31d, a pair of take-up rollers 51 and 51 are disposed, between which rollers a widely spread multi-filament bundles sheet Tw coming out of the yarn passage hole h of the fluid flowing portion 31d is taken up at the velocity of 10 m/minute so as to be wound up around a wind-up beam B. To note, reference numeral 8 in FIG. 32 indicates a well-known drying roller to remove water from the spread multi-filament bundles sheet Tw coming out of the yarn passage hole h of the farthest fluid flowing portion 31d in a wetted condition.

Apparatus Example 18

FIG. 33 shows an apparatus example 18 that is used in the 'method of producing a spread multi-filament bundles sheet' according to the above seventh embodiment. The difference between this apparatus and the apparatus example 17 lies in that the former is provided with a fluid flowing spreader 3 of diametrically enlarged water-sealed tube type, which spreader is segmented into the respective fluid flowing portions 31a, 31b, 31c and 31d with an interval between them, and the other structural arrangement thereof is the same as the apparatus example 17. Only one circulation pump 34 and the sole flow rate adjustment valve 33 are required for the apparatus hereof in comparison with the apparatus example 17, so that the manufacturing cost thereof is reduced and the operation thereof is facilitated.

The preferred embodiments of the invention are substantially described above, to which embodiments the invention is not limited, but it can be modified into various manners within the scope of the accompanying patent claims. For instances, the following modified examples also belong to the technical scope of the invention.

(1) The creel 1 of the first through seventh embodiments and the apparatus examples 1 through 18 respectively being arranged such that the respective bundles Tm unwound from three to five bobbins are processed, but the number of bobbins being not limited to three, which number may be increased such that an arbitrary number of the bundles unwound from as many bobbins is processed.

(2) A floating control bridge 35 of circular rod type being adopted for the first through seventh embodiments and the first through eighteenth apparatus examples respectively, the central portion of which rod may be formed into an entasis shape.

(3) A heater 7 of hot fan heating type being adopted for some of the above embodiments, which heater is not limited to a hot fan heater, an ultrasonic oscillator or a far-infrared radiation device may be adoptable instead.

(4) In the above seventh embodiment, hot water of 80 degrees Centigrade being used for providing a fluid friction to the respective bundles Tm so as to spread them, which fluid friction may be provided by cold water or warmed water, in addition to which, air bubbles may be hit onto the monofilaments of the respective bundles Tm by use of such liquid-gas two-phase flow as air bubbles containing water so as to be broken in collision into particulate bubbles, which particulate bubbles flow through any adjacent monofilaments of the respective bundles that are slackened by such collision.

(5) Further, in the above third embodiment, a resin impregnation process being provided in addition along the downstream side of the apparatus example 5 as shown in FIG. 9, wherein a resin sheet St is laid over to the respective upper and lower side surfaces of a spread multi-filament bundles sheet Tw in the process of being produced, over which respective resin sheets a release sheet Rs is further laid, and the resin sheet St is fused onto the upper and lower surfaces respectively of the spread sheet Tw by means of a bonding device H, and then a pre-impregnation sheet P as obtained is peeled off and wound up around a wind-up roller R.

INDUSTRIAL APPLICABILITY

In a method of producing a spread multi-filament bundle and an apparatus used in the same according to the invention, such mechanism is adopted as passing in suspension a multi-filament bundle or a number of multi-filament bundles respectively unwound and fed from a supplier or a creel through a plurality of fluid flowing portions disposed in succession along the moving course of the respective bundles to be subjected to fluidal resistance so as to bend towards a direction to which a fluid flows and flowing the fluid through the adjacent monofilaments of the respective bundles whose bonding is slackened due to such fluidal resistance, which mechanism allows a spread multi-filament bundle to be produced with high efficiency while a homogeneous and high-quality spread multi-filament bundles sheet to be mass-produced with the fringe side monofilaments of any adjacent bundles tangentially aligned in parallel and the monofilaments thereof distributed uniformly in density, so that the industrial applicability of the invention is very high.

The structural arrangement of the apparatus according to the invention is streamlined such that it essentially consists of a creel, a multi-filament bundle feeder, a fluid flowing spreader comprising a plurality of fluid flowing portions disposed in succession along the moving course of the respective bundles, by use of which apparatus such multi-filament bundles of higher strength as carbon fibers, ceramic fibers, polyoxymethylene fibers, aromatic polyamide fibers are spread with high efficiency and in a space-saving manner so as to produce a spread multi-filament bundle or s spread multi-filament bundles sheet with lower production cost and higher productivity, so that the industrial applicability of the invention is very high.

The invention claimed is:

1. A method of producing a spread multi-filament bundle comprising the steps of:

subjecting a multi-filament bundle in carriage to fluctuation of a tensile force applied to said bundle alternatively between tension and relaxation by locally and reciprocally pressing said bundle fed from a yarn supplier crosswise with regard to a moving course of said bundle;

passing in suspension said multi-filament bundle moving under said fluctuation through a plurality of fluid flowing portions in succession comprising a fluid flowing spreader, said portions being disposed in series along a moving course of said multi-filament bundle;

subjecting said multi-filament bundle to fluidal resistance while said bundle moves through said respective fluid flowing portions so as to bend said bundle towards a direction to which a fluid in use flows; and flowing said fluid through an interstice between any adjacent monofilaments of said bundle whose bonding is slackened due to said fluidal resistance so as to widen said interstice, thereby, promoting spreading operation on said bundle, wherein said multi-filament bundle to be subjected to said spreading operation is continuously passed through said fluid flowing portion located in an upstream side of the spreader to said fluid flowing portion located in a downstream side of the spreader in succession to gradually enlarge contact area between said bundle and said fluid so as to widely spread said multi-filament bundle in a progressive manner.

2. A method of producing a spread multi-filament bundle according to claim 1 further comprising the steps of:
providing a linearly back-and-forth friction widthwise with regard to said bundle.

3. A method of producing a spread multi-filament bundle according to claim 1 wherein said multi-filament bundle unwound from said yarn supplier is fed while restrained from being drawn back.

4. A method of producing a spread multi-filament bundle according to claim 3 wherein a floating control bridge to secure a degree by which said bundle bends at a predetermined level is provided in said plurality of fluid flowing portions respectively such that said bundle is put into contact with a fluid under said floating control bridge so as not to make said degree by which said bundle passing through said respective fluid flowing portions bends smaller than said predetermined level.

5. A method of producing a spread multi-filament bundle according to claim 4 wherein said bundle passes in suspension through said respective fluid flowing portions respectively disposed in series along said moving course of said bundle in such a manner that a sizing agent contained in said bundle in passage is softened by heating so as to make bonding between monofilaments comprising said bundle slackened.

6. A method of producing a spread multi-filament bundle according to claim 1,
wherein the method is applied to respective multi-filament bundles unwound from respective yarn suppliers of a creel aligned in parallel and in the same plane.

7. A method of producing a spread multi-filament bundle according to claim 6, further comprising the step of:
providing a linearly back-and-forth friction widthwise with regard to a group of spread multi-filament bundles moving in the same plane so as to produce a spread multi-filament bundles sheet with fringe side monofilaments of any adjacent spread bundles tangentially aligned and monofilaments as a whole of said respective spread bundles uniformly distributed in density.

8. A method of producing a spread multi-filament bundle according to claim 1, wherein said tensile force is applied at a point on the bundle upstream of the fluid flowing portions prior to said bundle passing through the fluid flowing portions.

9. A method of producing a spread multi-filament bundle according to claim 1, wherein said tensile force is applied to the spread multi-filament bundle downstream of the fluid flowing portions.

10. A method of producing a spread multi-filament bundle according to claim 1, wherein said tensile force is applied to the spread multi-filament bundle when passing through the fluid flowing portions.

11. An apparatus for producing a spread multi-filament bundle comprising:
one of a supplier and a creel provided with a number of suppliers;
a multi-filament bundle feeder to unwind one of a multi-filament bundle and a group of said multi-filament bundles from one of said supplier and said suppliers of said creel under a certain tension and to feed one of said multi-filament bundle and said group of multi-filament bundles with a restraint being drawn back while keeping one of said multi-filament bundle and said group of multi-filament bundles in a plane;
a fluid flowing spreader provided with a plurality of fluid flowing portions disposed in series along a moving course of one of said bundle and said group of bundles respectively to put a fluid into contact with and pass said fluid through one of said bundle and said group of bundles with one of said bundle and said group of bundles in carriage supported in suspension, said fluid flowing crosswise with regard to said moving course; and
a tensile force variable system to change a tensile force applied to one of said bundle and said group of bundles in carriage alternatively between tension and relaxation.

12. An apparatus for producing a spread multi-filament bundle according to claim 11 wherein said tensile force variable system comprises
an elevating rod provided with a press roller at its lower end portion;
a contractile and extensile crank arm engaged to said elevating rod; and
a crank motor whose power shaft is provided with a rotor in engagement with said crank arm.

13. An apparatus for producing a spread multi-filament bundle according to claim 11 wherein a tension stabilizing mechanism is provided at an upstream side from said fluid flowing spreader, said mechanism being provided with a tension stabilizing roller to abut a multi-filament bundle unwound and fed from one of a supplier and a creel under pressure and being arranged such that said tension stabilizing roller in abutment with said bundle continues pressing said bundle so as to increase a tensile force applied to said bundle along with increasing a degree by which said bundle bends until a predetermined tensile force is applied to said bundle when said tensile force applied to said bundle decreases below said predetermined tensile force and is inferior to a pressure applied by said roller while said tension stabilizing roller in abutment with said bundles is bounced back to retract along with decreasing said degree until said predetermined tensile force is applied to said bundle when said tensile force applied to said bundle increases above said predetermined tensile force and is superior to said pressure applied by said roller so as to keep said tensile force applied to said bundle in carriage constant.

14. An apparatus for producing a spread multi-filament bundle according to claim 11 wherein a floating control bridge running crosswise with regard to said moving course of one of said bundle and said group of bundles is provided inside said respective fluid flowing portions.

15. An apparatus for producing a spread multi-filament bundle according to claim 14 wherein said floating control bridge is formed into a cylindrical shape whose middle portion diametrically bulges like an entasis.

16. An apparatus for producing a spread multi-filament bundle according to claim 11 wherein a heater is disposed above and opposite to said respective fluid flowing portions so as to apply heating treatment on one of said bundle and said group of bundles in passage.

17. An apparatus for producing a spread multi-filament bundle according to claim 11 wherein a widthwise back-and-forth friction system is disposed to provide back-and-forth friction widthwise with regard to one of said bundle and said group of bundles in a process of being spread in abutment with monofilaments comprising said one of said bundle and said group of bundles respectively.

18. An apparatus for producing a spread multi-filament bundle according to claim 11 wherein a prolonged opening provided along said moving course of one of said bundle and said group of bundles is segmented into said respective fluid flowing portions with an interval.

19. An apparatus for producing a spread multi-filament bundle according to claim 11 wherein said plurality of fluid flowing portions respectively are of a diametrically enlarged watertight tube, on an entrance side and an exit side of which respective portions a yarn passage hole is provided, said watertight tube being provided with a liquid circulation passage through a circulation pipe connected to a circulation pump, an operation of which pump causes circulating water to circulate through at a flow velocity said respective fluid flowing portions via said circulation pipe to subject one of said bundle and said group of bundles to water resistance so as to bend said one of said bundle and said group of bundles passing through said yarn passage holes of said respective fluid flowing portions towards a direction to which said circulating water flows, through an interstice between adjacent monofilaments of one of said bundle and said group of bundles respectively said circulating water flows so as to widen said interstice.

\* \* \* \* \*